(12) United States Patent
Hu et al.

(10) Patent No.: US 12,363,691 B2
(45) Date of Patent: *Jul. 15, 2025

(54) METHODS AND DEVICES FOR TONE DISTRIBUTION FOR LOW POWER TRANSMISSIONS IN A WIRELESS NETWORK

(71) Applicant: MediaTek Singapore Pte. Ltd., Singapore (SG)

(72) Inventors: Shengquan Hu, San Jose, CA (US); Jianhan Liu, San Jose, CA (US); Gary A. Anwyl, San Jose, CA (US); Thomas Edward Pare, Jr., San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 212 days.

This patent is subject to a terminal disclaimer.

(21) Appl. No.: 17/349,722

(22) Filed: Jun. 16, 2021

(65) Prior Publication Data

US 2021/0400670 A1    Dec. 23, 2021

Related U.S. Application Data

(60) Provisional application No. 63/045,925, filed on Jun. 30, 2020, provisional application No. 63/040,026, filed on Jun. 17, 2020.

(51) Int. Cl.
*H04W 72/0453* (2023.01)
*H04L 5/00* (2006.01)
*H04W 52/02* (2009.01)

(52) U.S. Cl.
CPC ....... *H04W 72/0453* (2013.01); *H04L 5/0007* (2013.01); *H04L 5/0041* (2013.01); *H04L 5/0064* (2013.01); *H04W 52/0209* (2013.01)

(58) Field of Classification Search
None
See application file for complete search history.

(56) References Cited

U.S. PATENT DOCUMENTS

| | | | |
|---|---|---|---|
| 11,601,219 B2 * | 3/2023 | Liu | H04L 1/0007 |
| 2016/0050672 A1 * | 2/2016 | Chen | H04L 5/0037 370/329 |
| 2016/0088599 A1 * | 3/2016 | Yang | H04L 5/0041 370/329 |
| 2017/0104553 A1 * | 4/2017 | Liu | H04L 27/2626 |

(Continued)

FOREIGN PATENT DOCUMENTS

WO    WO-2011099719 A2 *   8/2011   ....... H04L 25/03828

OTHER PUBLICATIONS

Qi, U.S. Appl. No. 62/931,920, filed Nov. 7, 2019 (Year: 2019).*

(Continued)

*Primary Examiner* — Jay L Vogel

(57) ABSTRACT

Accordingly, embodiments of the present invention provide methods and devices for low power transmissions that provide improved wireless coverage for 6 GHz LPI transmissions using novel tone mapping techniques. Resource units (RUs) tones are distributed over larger bandwidths to achieve higher transmission power while operating within the PSD requirements of LPI. The tone distribution can include global tone mapping of smaller RUs distributed onto larger bandwidths, or group-based tone distribution methods, for example.

17 Claims, 26 Drawing Sheets

(56) References Cited

U.S. PATENT DOCUMENTS

| | | | |
|---|---|---|---|
| 2017/0118315 A1* | 4/2017 | Sun | H04L 27/2613 |
| 2019/0281614 A1* | 9/2019 | Chen | H04L 5/0007 |
| 2020/0014509 A1* | 1/2020 | Asterjadhi | H04L 5/0041 |
| 2021/0058856 A1* | 2/2021 | Qi | H04W 48/16 |
| 2021/0266847 A1* | 8/2021 | Cariou | H04W 52/52 |
| 2021/0282146 A1* | 9/2021 | Kim | H04W 72/23 |
| 2021/0288768 A1* | 9/2021 | Yang | H04L 5/0044 |
| 2021/0288769 A1* | 9/2021 | Yang | H04L 5/0048 |
| 2021/0289500 A1* | 9/2021 | Yang | H04W 72/0453 |

OTHER PUBLICATIONS

Yang, U.S. Appl. No. 63/027,349, filed May 19, 2020 (Year: 2020).*
Cariou, U.S. Appl. No. 62/023,529 on May 12, 2020 (Year: 2020).*

* cited by examiner

Data and pilot subcarrier indices for Distributed Tone RUs (dRU) in a 20 MHz EHT TB PPDU for 6GHz LPI

| dRU type | dRU index and subcarrier range | | | | | | | | | |
|---|---|---|---|---|---|---|---|---|---|---|
| | dRU1 indices range | dRU2 indice range | dRU3 indice range | dRU4 indice range | dRU5 indice range | | | | | |
| 26-tone dRU i=1-9 | dRU6 indice range | dRU7 indice range | dRU8 indice range | dRU9 indice range | | | | | | |
| 52-tone dRU i=1-4 | dRU1 26-tone {dRU1, dRU2} | | dRU2 26-tone {dRU3, dRU4} | | | | | | | |
| | dRU3 26-tone {dRU6, dRU7} | | dRU4 26-tone {dRU8, dRU9} | | | | | | | |
| 106-tone dRU i=1-2 | dRU1 26-tone {dRU1~4}, or 52-tone {dRU1,dRU2}, two extra tones | | | | | | | | | |
| | dRU2 26-tone {dRU6~9}, or 52-tone {dRU3,dRU4}, two extra tones | | | | | | | | | |

| dRU type | Data and pilot subcarrier indices for interleaved RUs (dRUs) in a 40 MHz EHT TB PPDU for 6GHz LPI | | | | | |
|---|---|---|---|---|---|---|
| | dRU index and subcarrier range | | | | | |
| 26-tone dRU i=1:38 | dRU1 indices range | dRU2 indice range | dRU3 indice range | dRU4 indice range | dRU5 indice range | |
| | dRU6 indice range | dRU7 indice range | dRU8 indice range | dRU9 indice range | | |
| | dRU10 indices range | dRU11 indice range | dRU12 indice range | dRU13 indice range | dRU14 indice range | |
| | dRU15 indice range | dRU16 indice range | dRU17 indice range | dRU18 indice range | | |
| 52-tone dRU i=1:8 | dRU1 26-tone [dRU1, dRU2] | | 26-tone [dRU3, dRU4] | | | |
| | dRU3 26-tone [dRU6, dRU7] | | 26-tone [dRU8, dRU9] | | | |
| | dRU5 26-tone [dRU10, dRU11] | | 26-tone [dRU12, dRU13] | | | |
| | dRU7 26-tone [dRU15, dRU16] | | 26-tone [dRU17, dRU18] | | | |
| 106-tone dRU i=1:4 | dRU1 26-tone [dRU1~4], or 52-tone [dRU1,dRU2], two extra tones | | | | | |
| | dRU2 26-tone [dRU6~9], or 52-tone [dRU3,dRU4], two extra tones | | | | | |
| | dRU3 26-tone [dRU10~13], or 52-tone [dRU5,dRU6], two extra tones | | | | | |
| | dRU4 26-tone [dRU15~19], or 52-tone [dRU7,dRU8], two extra tones | | | | | |
| 242-tone dRU i=1:2 | dRU1 106-tone [dRU1~2] and 26-tone dRU5 and four extra tones, or 26-tone [dRU1~9] and eight extra tones | | | | | |
| | dRU2 106-tone [dRU3~4] and 26-tone dRU14 and four extra tones, or 26-tone [dRU10~18] and eight extra tones | | | | | |

| dRU type | Data and pilot subcarrier indices for Distributed Tone RUs (dRUs) in a 80 MHz EHT TB PPDU for 5GHz LPI | | | | dRU index and subcarrier range | | | |
|---|---|---|---|---|---|---|---|---|
| 26-tone dRU i=1:37 | dRU1 | dRU2 | dRU3 | dRU4 | dRU5 | | | |
| | indices range | indice range | indice range | indice range | indice range | | | |
| | dRU6 | dRU7 | dRU8 | dRU9 | dRU10 | | | |
| | indice range | indice range | indice range | indice range | indice range | | | |
| | dRU10 | dRU11 | dRU12 | dRU13 | dRU14 | | | |
| | indices range | indice range | indice range | indice range | indice range | | | |
| | dRU15 | dRU16 | dRU17 | dRU18 | dRU19 | | | |
| | indice range | indice range | indice range | indice range | not defined | | | |
| | dRU20 | dRU21 | dRU22 | dRU23 | dRU24 | | | |
| | indices range | indice range | indice range | indice range | indice range | | | |
| | dRU25 | dRU26 | dRU27 | dRU28 | | | | |
| | indice range | indice range | indice range | indice range | | | | |
| | dRU29 | dRU30 | dRU31 | dRU32 | dRU33 | | | |
| | indices range | indice range | indice range | indice range | indice range | | | |
| | dRU34 | dRU35 | dRU36 | dRU37 | | | | |
| | indice range | indice range | indice range | indice range | | | | |
| 52-tone dRU i=1:16 | dRU1 | | | dRU2 | | | | |
| | 26-tone {dRU1, dRU2} | | | 26-tone {dRU3, dRU4} | | | | |
| | dRU3 | | | dRU4 | | | | |
| | 26-tone {dRU6, dRU7} | | | 26-tone {dRU8, dRU9} | | | | |
| | dRU5 | | | dRU6 | | | | |
| | 26-tone {dRU10, dRU11} | | | 26-tone {dRU12, dRU13} | | | | |
| | dRU7 | | | dRU8 | | | | |
| | 26-tone {dRU15, dRU16} | | | 26-tone {dRU17, dRU18} | | | | |
| | dRU9 | | | dRU10 | | | | |
| | 26-tone {dRU20, dRU21} | | | 26-tone {dRU22, dRU23} | | | | |
| | dRU11 | | | dRU12 | | | | |
| | 26-tone {dRU25, dRU26} | | | 26-tone {dRU27, dRU28} | | | | |
| | dRU13 | | | dRU14 | | | | |
| | 26-tone {dRU29, dRU30} | | | 26-tone {dRU31, dRU32} | | | | |
| | dRU15 | | | dRU16 | | | | |
| | 26-tone {dRU34, dRU35} | | | 26-tone {dRU36, dRU37} | | | | |
| 106-tone dRU i=1:8 | dRU1 | | | | | | | |
| | 26-tone {dRU1*4}, or 52-tone {dRU1,dRU2}, two extra tones | | | | | | | |
| | dRU2 | | | | | | | |
| | 26-tone {dRU5*3*4}, or 52-tone {dRU3,dRU4}, two extra tones | | | | | | | |
| | dRU3 | | | | | | | |
| | 26-tone {dRU11*13}, or 52-tone {dRU5, dRU6}, two extra tones | | | | | | | |
| | dRU4 | | | | | | | |
| | 26-tone {dRU15*18}, or 52-tone {dRU7,dRU8}, two extra tones | | | | | | | |
| | dRU5 | | | | | | | |
| | 26-tone {dRU20*23}, or 52-tone {dRU9,dRU10}, two extra tones | | | | | | | |
| | dRU6 | | | | | | | |
| | 26-tone {dRU25*28}, or 52-tone {dRU11, dRU12}, two extra tones | | | | | | | |
| | dRU7 | | | | | | | |
| | 26-tone {dRU29*32}, or 52-tone {dRU13,dRU14}, two extra tones | | | | | | | |
| | dRU8 | | | | | | | |
| | 26-tone {dRU34*37}, or 52-tone {dRU15,dRU16}, two extra tones | | | | | | | |
| 242-tone dRU i=1:4 | dRU1 | | | | | | | |
| | 106-tone {dRU1*4} and 26-tone dRU5 and four extra tones, or 26-tone {dRU1*9} and eight extra tones | | | | | | | |
| | dRU2 | | | | | | | |
| | 106-tone {dRU5*8} and 26-tone dRU14 and four extra tones, or 26-tone {dRU10*19} and eight extra tones | | | | | | | |
| | dRU3 | | | | | | | |
| | 106-tone {dRU5*6} and 26-tone dRU24 and four extra tones, or 26-tone {dRU20*28} and eight extra tones | | | | | | | |
| | dRU4 | | | | | | | |
| | 106-tone {dRU5*8} and 26-tone dRU33 and four extra tones, or 26-tone {dRU29*37} and eight extra tones | | | | | | | |
| 484-tone dRU i=1:2 | dRU1 | | | dRU2 | | | | |
| | 242-tone {dRU1, dRU2} | | | 242-tone {dRU3, dRU4} | | | | |

|  | BW20 (Dtd=9) | BW40 (Dtd=18) | BW80 (Dtd=18/36) | BW160 (Dtd=16/32/64 or 72) |
|---|---|---|---|---|
| RU26 | 2 | 1 | 1 | 1 |
| RU52 | 3 | 2 | 1 | 1 |
| RU106 | 6 | 3 | 2 | 1 |
| RU242 | na | 7 | 4 | 2 |

METHODS AND DEVICES FOR TONE DISTRIBUTION FOR LOW POWER TRANSMISSIONS IN A WIRELESS NETWORK

CROSS-REFERENCE TO RELATED APPLICATIONS

This application claims the benefit of and priority to provisional patent application Ser. No. 63/040,026, with filing date Jun. 17, 2020, and provisional patent application Ser. No. 63/045,925, with filing date Jun. 30, 2020, both of which are hereby incorporated by reference in their entirety.

FIELD

Embodiments of the present invention generally relate to the field of wireless communications. More specifically, embodiments of the present invention relate to systems and methods of tone distribution for transmission in wireless networks.

BACKGROUND

Modern electronic devices typically send and receive data with other electronic devices wirelessly using Wi-Fi, and recent advances in the field of Wi-Fi have enabled low power transmissions specifically designed for indoor environments to prevent or reduce undesirable interference with other wireless networks operating nearby. Low Power Indoor (LPI) is a Wi-Fi technology that uses a limited transmission power in the 6 GHz wireless band so that the transmitted signal does not generally leave the intended environment (e.g., building, room, etc.) and interfere with other 6 GHz transmission. LPI operating in the 6 GHz wireless band has strict power spectrum density (PSD) requirements for lower power transmissions.

Conventional LDPC Tone mapping is a wireless communication technique that takes constellation points and ensures they are mapped to Orthogonal Frequency Division Multiplexing (OFDM) subcarriers separated by a sufficient distance. For example, in a 40 MHz channel, two consecutive constellation points are separated by at least six OFDM subcarriers to achieve frequency diversity and prevent or mitigate interfere with successive bits. However, existing approaches to tone mapping are unable to provide adequate wireless coverage/range for LPI transmissions in the 6 GHz band. To provide sufficient wireless coverage within the PSD requirements of LPI, an improved method of tone distribution is needed.

SUMMARY

Accordingly, embodiments of the present invention provide methods and devices for low power transmissions that provide improved wireless coverage for 6 GHz LPI transmissions using novel tone mapping techniques. Resource units (RUs) tones are distributed over larger bandwidths to achieve higher transmission power while operating within the PSD requirements of LPI (fewer tones per MHz). For example, embodiments can support −1 dBm/MHz for uplink transmission, and 5 dBm/MHz for downlink communication.

According to one embodiment, a method of tone distribution for transmission in a wireless network is disclosed. The method includes accessing a resource unit (RU) tone index, generating a tone index permutation of distributed RUs using the RU tone index to distribute tones of logical RUs over a distribution window according to a tone distance parameter (DTD), and performing tone mapping to map tones of the logical RUs to tones of the distributed RUs.

According to some embodiments, the distribution window is defined according to a frequency bandwidth (BW) or a frequency subblock.

According to some embodiments, the distribution window size includes at least one of: 20 MHz; 40 MHz; 60 MHz; 80 MHz; and 160 MHz.

According to some embodiments, the generating a tone index permutation of distributed RUs includes interleaving tones of the logical RUs.

According to some embodiments, the tone distance parameter is determined based on a size of the distribution window and logical RU size.

According to some embodiments, the generating the tone index permutation includes generating distributed tone index values using the relationship:

$$k_{td} = (k * D_{td}) \bmod N_{st} + \left\lfloor \frac{k}{N_{col}} \right\rfloor$$

According to some embodiments, the logical RUs include at least one of a 26-tone RU, 52-tone RU, 106-tone RU, 242-tone RU, and a 484-tone RU.

According to some embodiments, the distribution window is defined according to a bandwidth.

According to some embodiments, the bandwidth includes at least one of: BW20; BW40; BW80; and BW160.

According to some embodiments, the generating a tone index permutation of distributed RUs includes grouping tones of the logical RUs.

According to some embodiments, the tone distance parameter is determined based on a size of the distribution window and a parameter defining a number of subcarriers per logical RU tone group ($N_{sg}$), and the number of subcarriers in a tone group is determined based on the size of the distribution window and a size of the logical RUs, and further the grouping tones of the logical RUs is performed according to the number of subcarriers per logical RU tone group.

According to some embodiments, the generating the tone index permutation of logical RUs includes generating distributed tone index values using the relationship:

$$k_{td} = (k \bmod N_{sg}) + N_{sg} * (r - 1) + D_{td} * \left\lfloor \frac{k}{N_{sg}} \right\rfloor$$

According to some embodiments, the method includes performing a downlink transmission using the distributed RUs in a Low Power Indoor (LPI) mode and performing the downlink transmission generates approximately −5 dBm/MHz.

According to some embodiments, the method includes performing an uplink transmission using the distributed RUs in a Low Power Indoor (LPI) mode and performing the uplink transmission generates approximately −1 dBm/MHz.

According to another embodiment, a method of tone distribution for transmission in a wireless network is disclosed. The method includes accessing a logical RU26 tone index for assigned RUs, mapping logical RU26 tones of the logical RU26 tone index to distributed RU26 tones, and generating a distributed RU26 tone index using the distributed RU26 tones to distribute the RU26 tones across a distribution window.

According to some embodiments, the generating a distributed RU26 tone index using the distributed RU26 tones includes generating distributed RU26 tone index values using the relationship:

$$k_{td} = (i-1) \bmod D_{td} + j*D_{td} + \left\lfloor \frac{i-1}{D_{td}} \right\rfloor *484 \text{ or}$$

$$k_{td} = (i-1) \bmod D_{td} + j*D_{td}$$

According to some embodiments, the generating a distributed RU26 tone index using the distributed RU26 tones that distributes the RU26 tones across a distribution window includes combining a plurality of RU26s to form a distributed RU, and the distributed RU includes at least one of: a distributed RU52; a distributed RU 106; and a distributed RU242.

According to some embodiments, further including appending extra tones to form the distributed RU.

According to some embodiments, the mapping logical RU26 tones of the logical RU26 tone index to distributed RU26 tone set index on BW20 uses the relationship:

$i = (13(r-1)) \bmod 9 + 1$.

According to a different embodiment, an apparatus is disclosed including a transceiver operating on a 6 GHz wireless band, a memory, and a processor operable to access a resource unit (RU) tone index stored in the memory, generate a tone index permutation of distributed RUs using the RU tone index to distribute tones of logical RUs over a distribution window according to a tone distance parameter (DTD), and perform tone mapping to map tones of the logical RUs to tones of the distributed RUs.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 7A is an example of a table of distributed RU index and subcarrier range values for 26-tone distributed RUs, 52-tone distributed RUs, and 106-tone distributed RUs over BW20 according to embodiments of the present invention.

FIG. 7B is an example of a table of distributed RU index and subcarrier range values for 26-tone distributed RUs, 52-tone distributed RUs, 106-tone distributed RUs, and 242 tone distributed RUs over BW40 according to embodiments of the present invention.

FIG. 7C is an example of a table of distributed RU index and subcarrier range values for 26-tone distributed RUs, 52-tone distributed RUs, 106-tone distributed RUs, 242 tone distributed RUs, and 484 tone distributed RUs over BW80 according to embodiments of the present invention.

FIG. 7D is an example of a table of the number of tones per MHz for an RU26-tone set based tone distribution method over BW20, BW40, BW80, and BW160 according to embodiments of the present invention.

DETAILED DESCRIPTION

Figure 1:
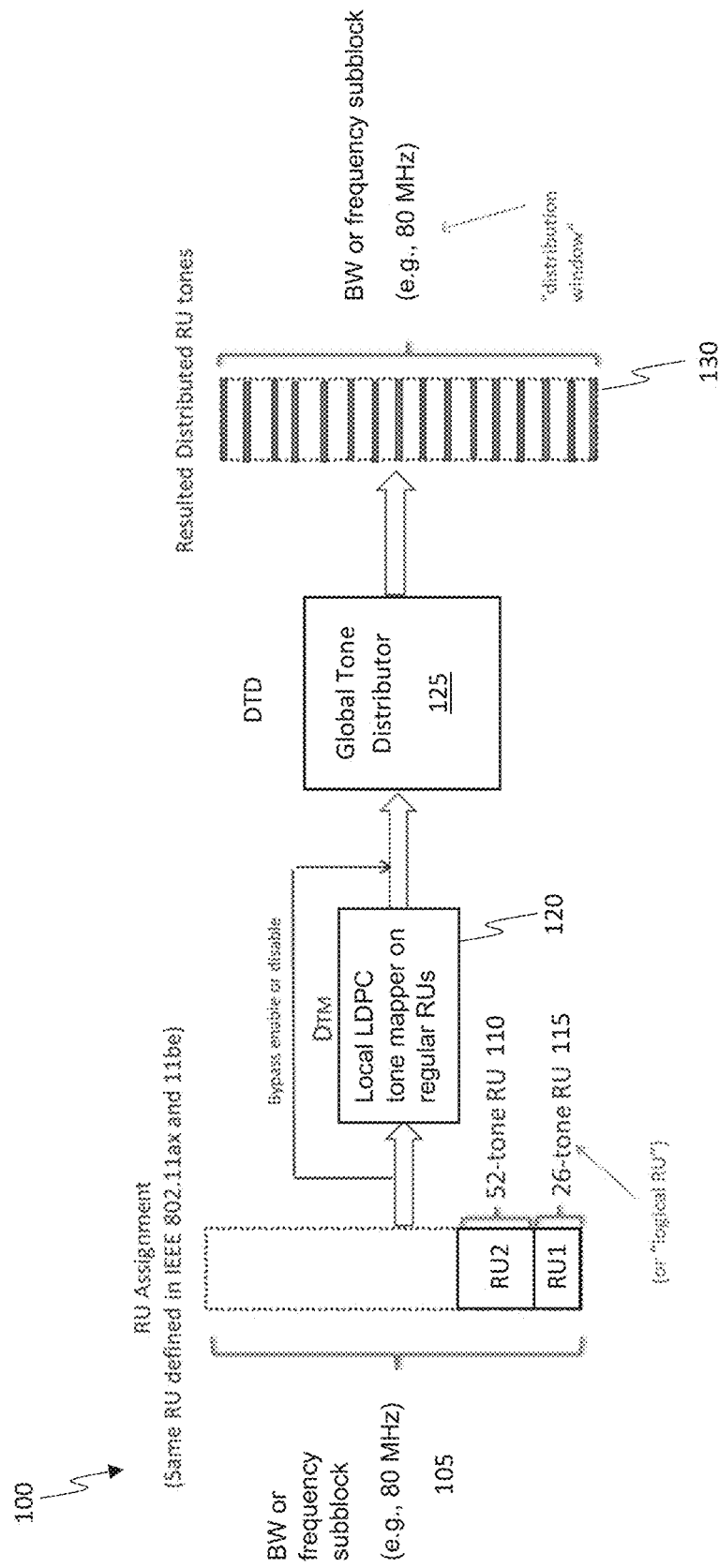
FIG. 1 is a block diagram of an exemplary computer-implemented tone distribution processes for LPI transmission in the 6 GHz wireless band depicted according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follow are presented and discussed in terms of a method. Although steps and sequencing thereof are disclosed in a figure herein (e.g., FIGS. 17-19) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic announces capable of being stored, transferred, combined, compared, and otherwise manipulated in a computer system. It has proven convenient at times, principally for reasons of common usage, to refer to these announces as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "configuring," "setting," "storing," "transmitting," "retransmitting," "authenticating," "identifying," "requesting," "reporting," "determining," or the like, refer to the action and processes of a computer system, or similar electronic processors, computing device, that manipulates and transforms data represented as physical (electronic) quantities within the computer system's registers and memories into other data similarly represented as physical quantities within the computer system memories or registers or other such information storage, transmission or display devices.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Methods and Devices for Tone Distribution for
Low Power Transmissions in a Wireless Network Embodiments of the present invention provide methods and devices for low power transmissions that provide improved wireless coverage for 6 GHz LPI transmissions using novel tone mapping techniques. Resource unit (RU) tones are distributed over larger bandwidths to achieve higher transmission power while operating within the PSD requirements of LPI. For example, embodiments of the present invention can advantageously reduce the number of tones per MHz to 1 tone per MHz (i.e −1 dBm per tone). The tone distribution can include global tone mapping of smaller RUs distributed onto larger bandwidths, or group-based tone distribution methods, or 26-tone RU based dRU distribution method, for example.

With regard to FIG. 1, a block diagram of an exemplary computer-implemented tone distribution processes 100 for LPI transmission in the 6 GHz wireless band depicted according to embodiments of the present invention. In FIG. 1, tones of relatively small RUs (e.g., 52-tone or 26-tone RUs) are distributed into a larger bandwidth to increase transmission power for LPI transmission. The initial RU assignment can be performed in largely the same way as conventional wireless transmissions (e.g., as defined in IEEE 802.11ax and 802.11be).

As depicted in FIG. 1, an 80 MHz Bandwidth (BW) or frequency subblock 105 is conceptually divided into several logical resource units, including a 52-tone RU 110 and a 26-tone RU 115. The logical RUs of BW80 RU 105 can be mapped using local LDPC tone mapper (tone interleaver) 120 using tone spacing parameter DTM to generate a tone index permutation. The variable DTD represents the tone mapping distance used by global tone mapper 125 to distribute logical RU tones over wider BW. In contrast to a conventional RU having continuously distributed tones, embodiments of the present invention spread the tones of the logical RUs over wider bandwidths to meet PSD requirements according to the DTD parameter.

In the example of FIG. 1, the resultant distributed RU tones 130 within the 80 MHz tone distribution window are interlaced such that the tones of the 52-tone RU and the 26-tone RU are distributed in an alternating manner. According to some embodiments, the tones are distributed such that there is 1 tone per MHz (e.g., −1 dBm per tone) to satisfy LPI PSD requirements and maximize the transmission power.

The logical RUs are distributed over a large bandwidth by global tone distributor 125 according to the variable DTD which defines how the logical RUs are distributed within the distribution window. According to some embodiments, the value of DTD is determined according to the distribution bandwidth size. The tone spacing (distance between tones) is then determined according to the DTD parameter, the distribution window size, and the logical RU size.

The value of DTD is typically an integer from 1 to 16, although DTD can be larger for large distribution bandwidths. Table I below includes several possible DTD values that can achieve larger tone separation and larger transmission power within the requirements of LPI for the 6 GHz wireless band.

TABLE I

| DTD for distribution window size | | | |
|---|---|---|---|
| 20 MHz | 40 MHz | 80 MHz | 160 MHz |
| 8, 9, 12, 13 | 13, 14, 15, 16 | 13, 14, 15, 16 | 13, 14, 15, 16 |

According to one embodiment, the tones of the logical RUs are distributed over a large bandwidth according to Equation I:

Global tone mapping onto large distribution bandwidth  Equation I $$k_{td} = (k * D_{td}) \bmod N_{st} + \left\lfloor \frac{k}{N_{col}} \right\rfloor$$

$k = 0, 1, \ldots, N_{st} - 1_{k=0,1,\ldots,N_{st}-1}$ $N_{st} = 242, 484, 996, \ldots$, etc for 20 MHz, 40 MHz, 80 MHz, $BW$ or frequency subblock $$N_{col} = \frac{N_{st}}{gcd(N_{st}, D_{td})}$$

In Equation I, k represents the logical RU index input, and $k_{td}$ represents the distributed RU tone index in the frequency domain generated by the global tone mapper.

Figure 2:
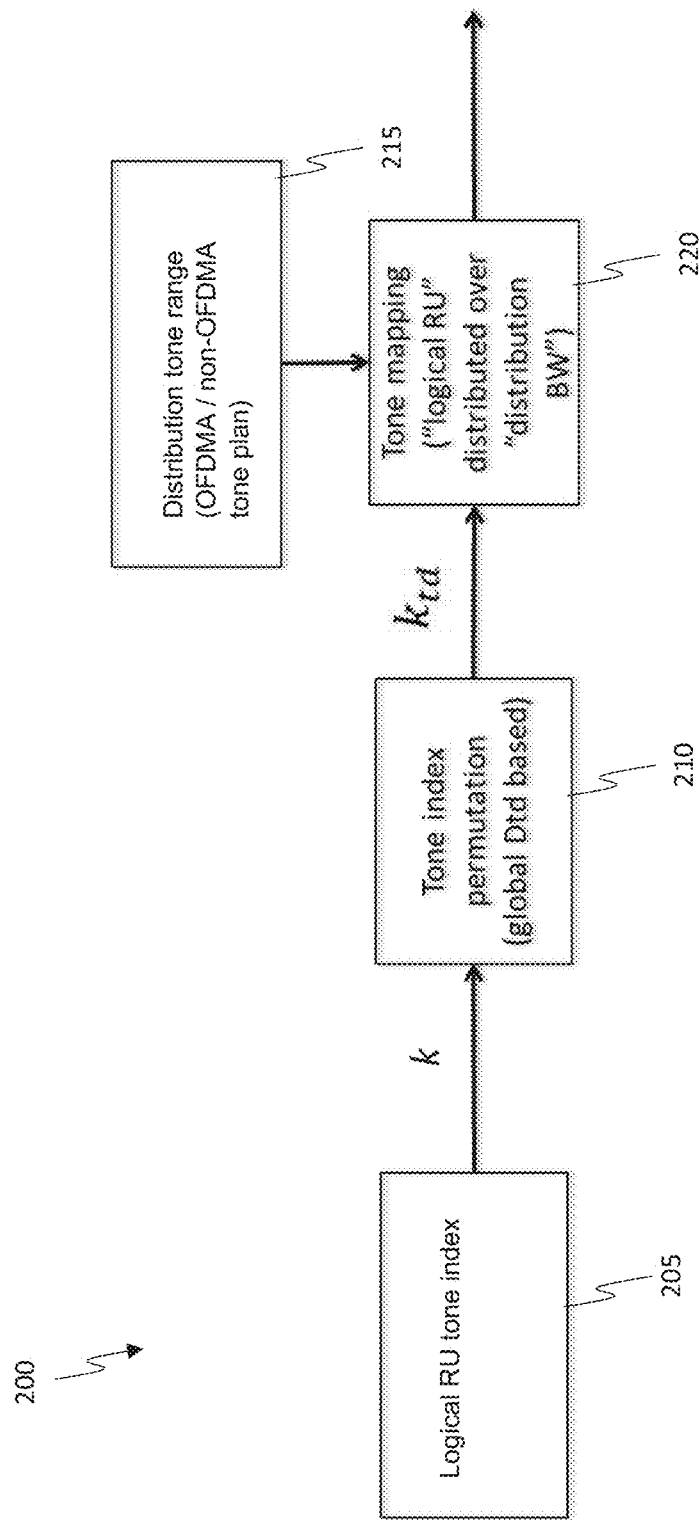
FIG. 2 is a flowchart of an exemplary computer-implemented tone mapping process for performing tone mapping on logical RUs to distribute the tones thereof over large bandwidths according to embodiments of the present invention.

FIG. 2 is a flowchart of an exemplary computer-implemented tone mapping process 200 for performing tone mapping on logical RUs to distribute the tones thereof over large bandwidths according to embodiments of the present invention. Logical RU index 205 (k) is input to a global tone mapper to generate a tone index permutation 210 for logical RUs according to the parameter DTD. The global tone mapper can distribute the tones of the logical RUs using Equation I, for example. The resultant distributed tone mapping 220 includes tones distributed over a larger distribution bandwidth according to distribution tone range (OFDMA or non-OFDMA tone plan) 215. By distributing the tones over a larger distribution window, the power of the transmission can be increased to improve wireless coverage within an environment.

Figure 3:
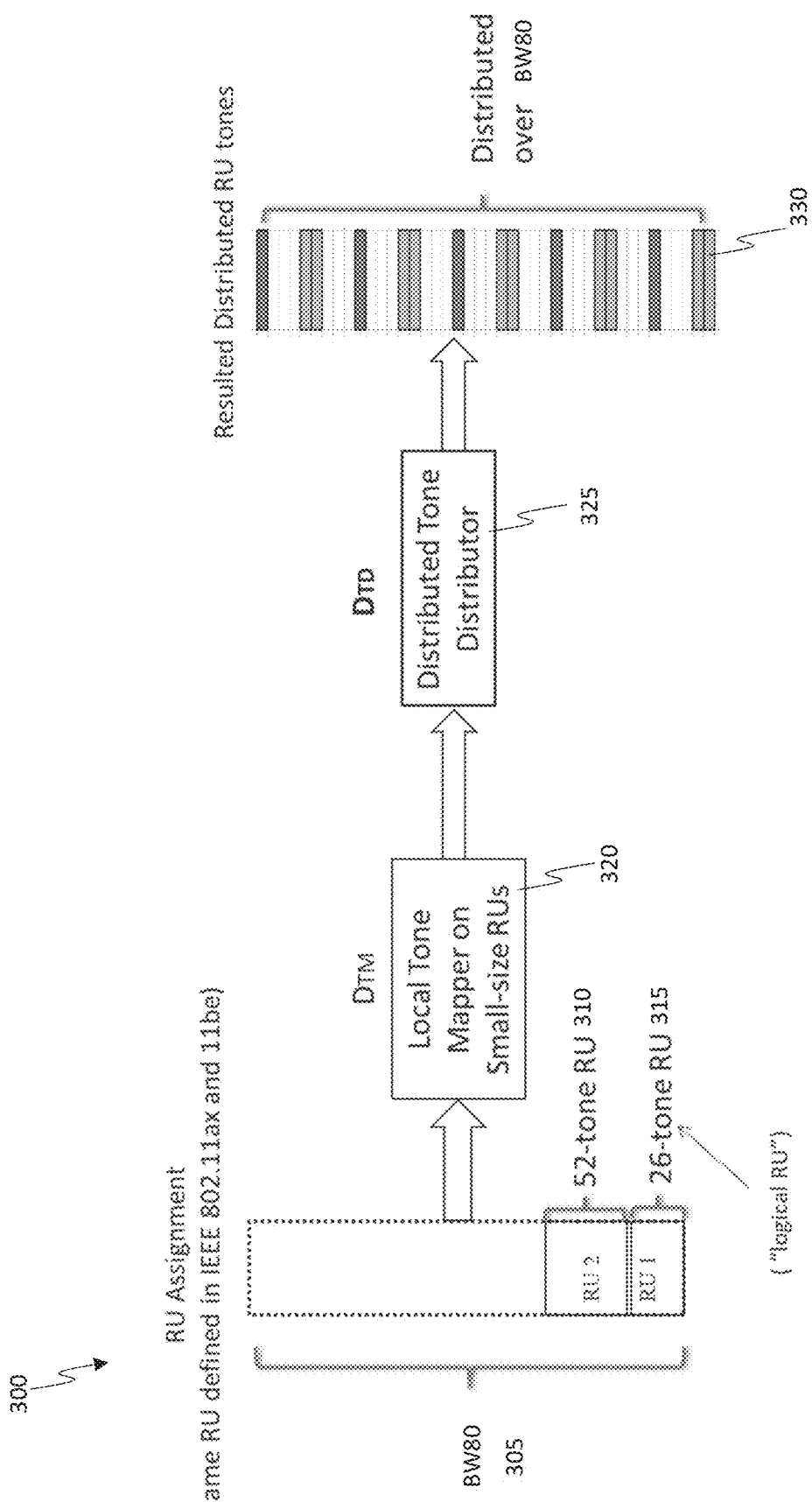
FIG. 3 is a block diagram of an exemplary group-based tone distribution processes for LPI transmission in the 6 GHz wireless band depicted according to embodiments of the present invention.

FIG. 3 is a block diagram of an exemplary group-based tone distribution processes 300 for LPI transmission in the 6 GHz wireless band depicted according to embodiments of the present invention. Rather than generating alternating/interlaced distributed RU tones, the embodiment depicted in FIG. 3 groups tones of the logical RUs for distribution over a large bandwidth (e.g., BW80). In the example of FIG. 3, 80 MHz bandwidth 305 includes multiple logical RUs, including 52-tone RU 310 and 26-tone RU 315. The initial RU assignment can be performed in the same way as conventional wireless transmissions (e.g., as defined in IEEE 802.11ax and 802.11be). 52-tone RU 310 and 26-tone RU 315 logical RUs of BW80 305 are mapped using local tone mapper 320 to generate a tone index permutation. According to some embodiments, the tones are distributed such that there is 1 tone per MHz (i.e. −1 dBm per tone). The group-based tone distribution methods described herein are well-suited for larger RUs that would otherwise wrap around when distributed over smaller bandwidths.

The variable DTM represents the LDPC tone mapping distance used by local tone mapper 320. Distributed tone distributor 325 distributes RU tones of the tone index permutation over BW20 305 according to the parameter DTD using a group-based tone distribution method. In contrast to the interlaced RU tones depicted in FIG. 1, the resultant RU tone distribution 330 includes groups of RU tones generated according to the assigned RU size, the assigned RU index, and the distribution window size. The group-based tone distribution can be performed using Equation II or Equation III below:

Group–based tone mapping for large bandwidth  Equation II $$k_{td} = (k \bmod N_{sg}) + N_{sg} * (r-1) + D_{td} * \left\lfloor \frac{k}{N_{sg}} \right\rfloor;$$

$k = 0, 1, \ldots, N_{st} - 1$ $N_{st} = 29, 52, 106, 242$ for $RU26, RU52,$ $RU106, RU242$ respectively;

$k_{td} = k_{td} + N_{guard,left},$ $N_{guard,left} = 6$ for $BW20M$ and 12 for $BW40M,$ $BW80M, BW160M$ etc If $k_{td} > \frac{N_{fft}}{2} - N_{DC}, k_{td} = k_{td} + N_{DC}$ In Equation II, the tone distribution parameters DTD (tone spacing) and NSG (group size) are determined based on the distribution window size and the logical RU size. Table II below includes DTD values used by Equation II for distribution window size 20 MHz, 40 MHz, 80 MHz, and two options for 160 MHz:

TABLE II

| DTD parameter values | | | | |
|---|---|---|---|---|
| DTD | | | | |
| 20 MHz | 40 MHz | 80 MHz | 160 MHz (Opt1) | 160 MHz (Opt2) |
| 8 | 16 | 32 | 32 | 64 |

Table III below includes NSG values for logical or distributed RU size of RU26, RU52, RU106, and RU242 used by Equation II.

TABLE III

| NSG parameter values | | | |
|---|---|---|---|
| NSG | | | |
| RU26 | RU52 | RU106 | RU242 |
| 1 | 2 | 4 | 8 |

According to some embodiments, the group-based tone distribution is performed using Equation III:

Group-based tone mapping  Equation III $$k_{td} = (k \bmod N_{sg}) + N_{sg} * \left(\left\lceil \frac{r}{N_{sec}} \right\rceil - 1\right) + D_{td} * \left\lfloor \frac{k}{N_{sg}} \right\rfloor + N_{sft\_r}$$

$$N_{sft\_r} = (r-1) \bmod N_{sec} * N_{sec\_sc}$$

$$N_{sec} = \begin{cases} 4: & \text{for } RU26 \text{ distributed over } 160 MHxz \\ 2: & \text{for } RU26 \text{ distributed over } 80 \text{ MHz or} \\ & RU52 \text{ distributed over } 160 \text{ MHz} \\ 1: & \text{otherwise} \end{cases}$$

$$N_{sec\_sc} = \begin{cases} 16*26: & \text{for } RU26 \text{ distributed over } 80 \text{ MHz or } 160 \text{ MHz} \\ 16*52: & \text{for } RU52 \text{ distributed over } 160 \text{ MHz} \\ 0: & \text{otherwise} \end{cases}$$

In Equation III, the tone distribution parameters DTD and NSG are determined based on the distribution window size and the logical RU size. Table IV below includes DTD values for distribution window size 20 MHz, 40 MHz, 80 MHz and 160 MHz:

TABLE IV

| DTD parameter values | | | |
|---|---|---|---|
| DTD | | | |
| 20 MHz | 40 MHz | 80 MHz | 160 MHz |
| 8 | 16 | 16 | 16 |

Table V below includes NSG values used by Equation III for RU26, RU52, RU106, and RU242 according to the distribution window size.

TABLE V

| DTD parameter values | | | | |
|---|---|---|---|---|
| | Nsg | | | |
| | 20 MHz | 40 MHz | 80 MHz | 160 MHz |
| RU26 | 1 | 1 | 1 | 1 |
| RU52 | 2 | 2 | 1 | 1 |
| RU106 | 4 | 4 | 2 | 1 |
| RU242 | na | 8 | 4 | 2 |

Figure 4:
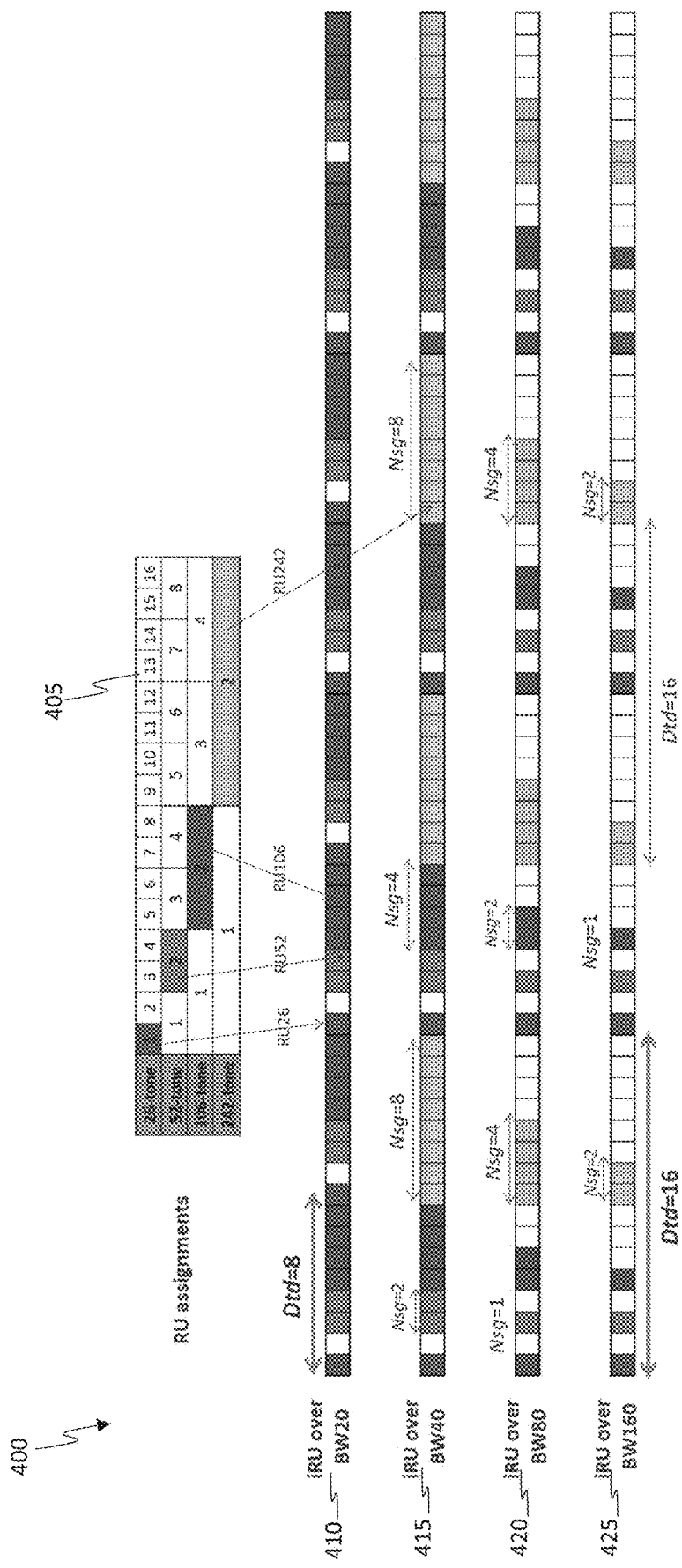
FIG. 4 is a block diagram of an exemplary distributed tone mappings of logical RUs mapped onto a large bandwidth (BW20, BW40, BW80, BW160) according to embodiments of the present invention.

With regard to FIG. 4, exemplary distributed tone mappings 400 of logical RUs mapped onto different bandwidth (BW20, BW40, BW80, BW160) is depicted according to embodiments of the present invention. RU assignment chart 405 depicts the mapping of assigned RUs for 26-tone RUs, 52-tone RUs, 106-tone RUs, and 242-tone RUs. The logical RUs are mapped using a distributed tone distributor 325 according to the parameters DTD and NSG. For example, the tones can be mapped to the large bandwidth using Equation II or Equation III described above. The resultant tone distributions 400 are advantageously distributed over large bandwidths to achieve higher transmission power while operating within the PSD requirements of LPI. According to some embodiments, the tones are distributed such that there is 1 tone per MHz (i.e. −1 dBm per tone). For example, embodiments can support −1 dBm/MHz for uplink transmission, and 5 dBm/MHz for downlink communication.

In the example of FIG. 4, the tones are mapped using Equation III. As depicted above in Table V, the value of DTD is 8 for distribution window size 20 MHz, and 16 for distribution window size 40 MHz, 80 MHz, and 160 MHz. Accordingly, the logical RU distributed over distribution window BW20 410 uses a tone spacing (DTD) value of 8. This indicates the number of tones between consecutive tones of a logical RU. For BW40 415, BW80 420, and BW160 425, a DTD value of 16 is used. The NSG value is determined according to Table IV.

Specifically, for a 26-tone RU, the value of NSG is always 1. For a 52-tone RU distributed over distribution window BW20 410, the value of NSG is 2. For a 106-tone RU distributed over distribution window BW20 410, the value of NSG is 4. A 242-tone RU cannot be distributed over distribution window BW20 410.

Regarding distribution window BW40, for a 52-tone RU distributed over distribution window BW40 415, the value of NSG is 2. For a 106-tone RU distributed over distribution window BW40 415, the value of NSG is 4. For a 242-tone RU distributed over distribution window BW40 415, the value of NSG is 8.

Regarding distribution window BW80, for a 52-tone RU distributed over distribution window BW80 420, the value of NSG is 1. For a 106-tone RU distributed over distribution window BW80 420, the value of NSG is 2. For a 242-tone RU distributed over distribution window BW80 420, the value of NSG is 4.

Regarding distribution window BW160, for a 52-tone RU distributed over distribution window BW160 425, the value of NSG is 1. For a 106-tone RU distributed over distribution window BW160 425, the value of NSG is 1. For a 242-tone RU distributed over distribution window BW160 425, the value of NSG is 2.

Figure 5A:
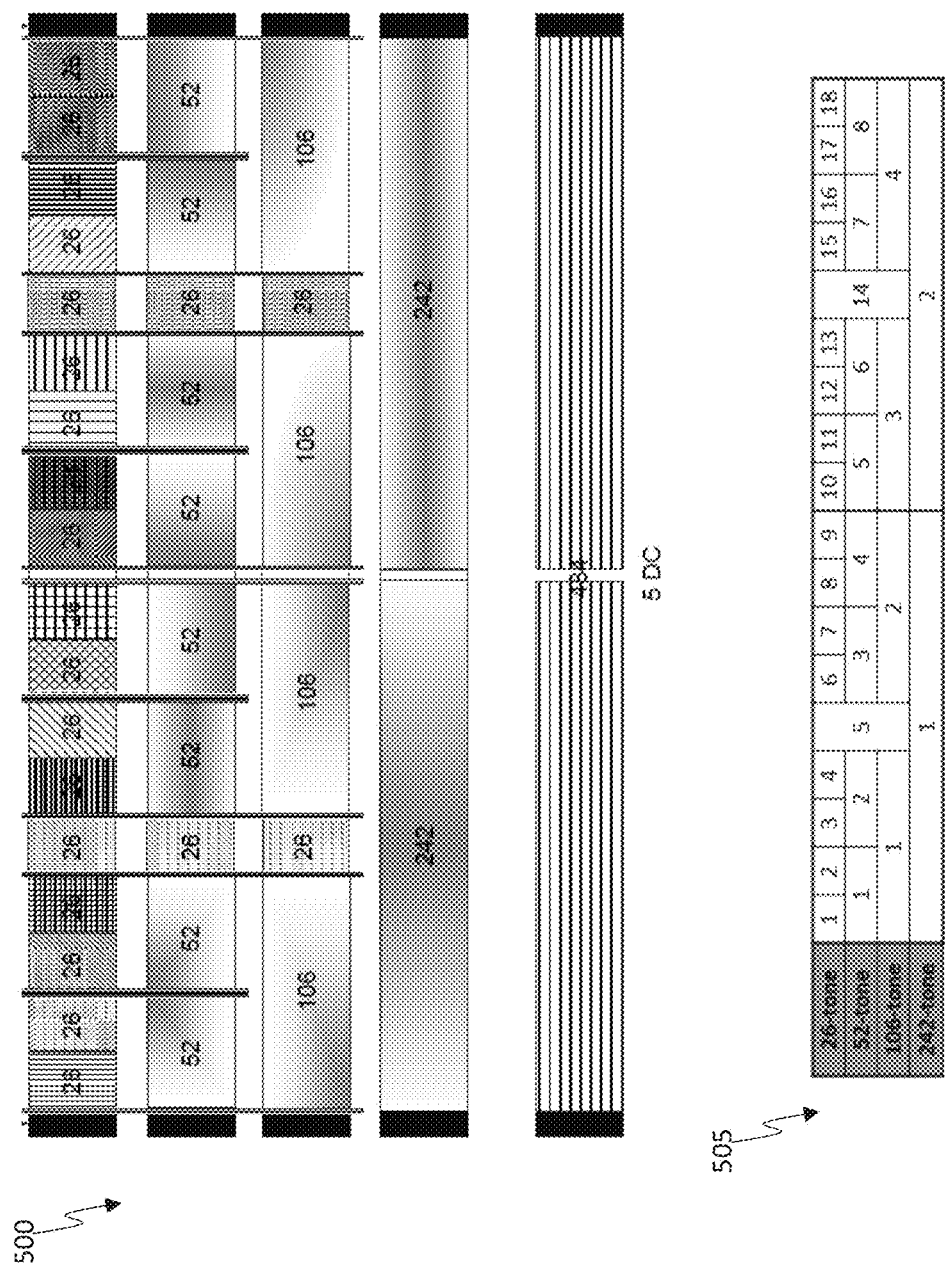
FIG. 5A illustrates the hierarchical structure of an exemplary 26-tone RU and logical index in BW40 for distributed RU design according to embodiments of the present invention.

FIG. 5A illustrates the hierarchical structure 500 of 26-tone RU for distributed RU design according to embodiments of the present invention. Distributed RUs with more than 26 tones can be built based on distributed-RU26 tone sets. For example, one distributed-RU52 can be built from two distributed-RU26, and one distributed-RU106 can be built from four RU26 or two RU52 with two reminding/leftover tones appended at the end. Logical RU index in BW40 505 shows the corresponding index mapping for exemplary 26-tone RUs, 52-tone RUs, 106-tone RUs, and 242-tone RUs according to embodiments of the present invention.

Figure 5B:
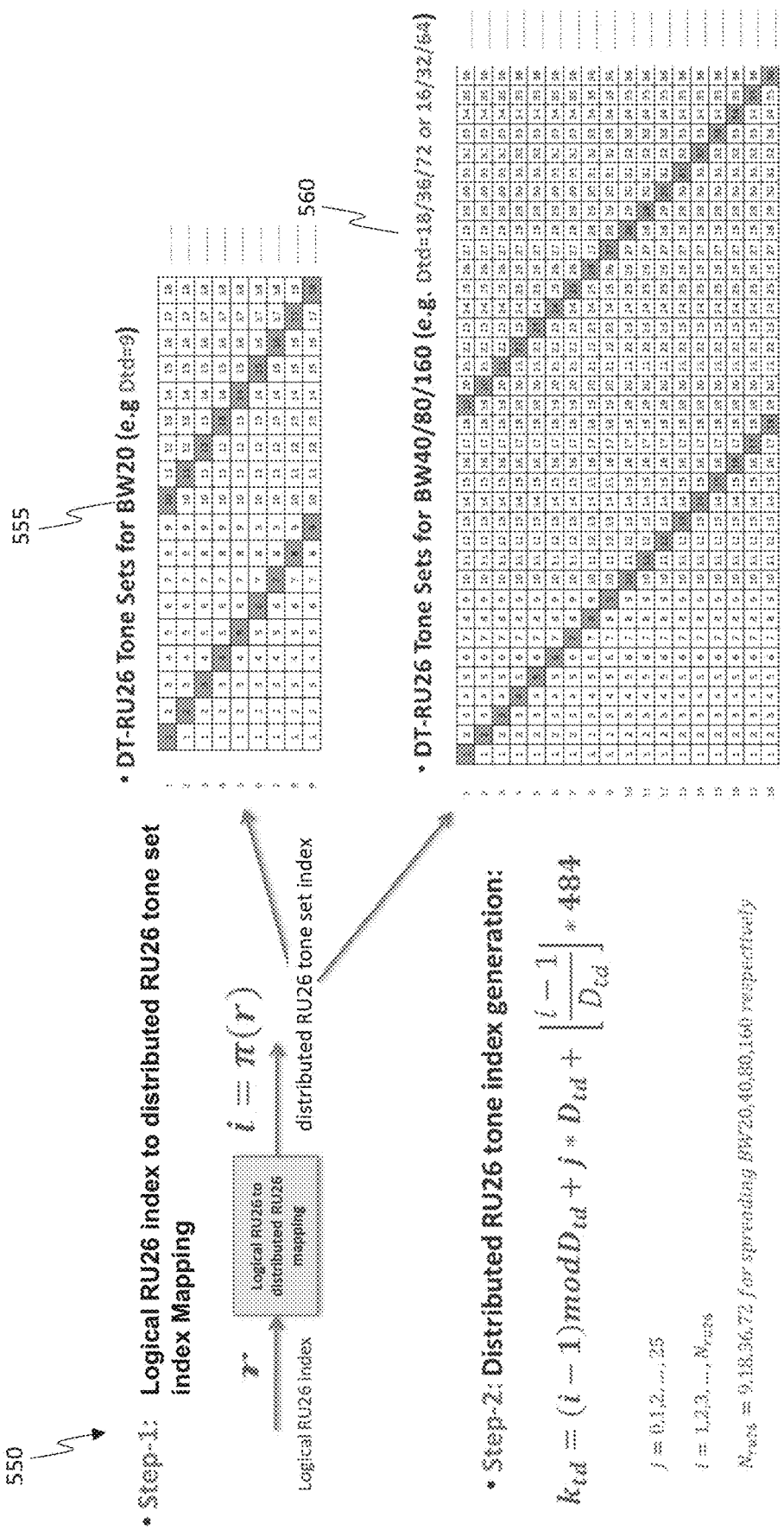
FIG. 5B depicts an exemplary computer-implemented tone distribution process for distribution over BW20 using a 26-tone RU based distributed tone RU (dRU, or DT-RU) design method according to embodiments of the present invention.

FIG. 5B depicts an exemplary computer-implemented tone distribution process 500 for distribution over BW20 using a 26-tone RU based distributed tone (DT) design according to embodiments of the present invention. Process 500 can further reduce the number of tones per MHz for optimal power boost compared to other implementations.

In the first mapping step of process 550, the logical RU26 index is mapped to a distributed RU26 tone set index. The distributed RU26 tone set for BW20 555 and the distributed RU26 tone set for BW40, BW80, and BW160 560 are depicted in FIG. 5B. In the second mapping step of process 550, the distributed RU26 tone index is generated according to Equation IV below:

Distributed RU tone index generation      Equation IV $$k_{td} = (i-1) \bmod D_{td} + j*D_{td} + \left\lceil \frac{i-1}{D_{td}} \right\rceil * 484$$

$j = 0, 1, 2, \ldots, 25$ $i = 1, 2, 3, \ldots, N_{ru26}$ $N_{ru26} = 9, 18, 36, 72$ for spreading $BW20$, 40, 80, 160 respectively In Equation IV, $(i-1) \bmod D_{td}$ represents the starting subcarrier index for distributed (DT) RU26 index i, $j*D_{td}$ represents the tone distribution with step-size $D_{td}$, and $(i-1/Dtd)*484$ represents the section shift (per 40 MHz). When using equation IV for distributed RU tone index generation, Dtd=9 for BW20; Dtd=18 for BW40/80; and Dtd=16 for BW160/320. $N_{ru26}$=9 for BW20, 18 for BW40, and 36 for BW80. $N_{ru26}$=64 for BW 160 and 128 for BW320.

As depicted in FIG. 5B, the logical RU26 index r is mapped to a distributed RU26 tone set index i, and the RU26 tone set index i is used for distributed tone RU26 index generation to produce distributed tone set $k_{td}$. Table VI below lists possible values of logical RU26 index r and distributed RU26 tone set index i for distribution over BW20 using i=(13(r−1))mod 9+1.

TABLE VI

RU tone distribution for RU26 (BW20)

| logical RU26 Index r (11be) | distributed RU26 tone set index i |
|---|---|
| 1 | 1 |
| 2 | 5 |
| 3 | 9 |
| 4 | 4 |
| 5 | 8 |
| 6 | 3 |
| 7 | 7 |
| 8 | 2 |
| 9 | 6 |

For tone distribution over BW80, if RU26 is distributed over the entire bandwidth (instead of over RU484 or 40 MHz segment), $D_{td}$=2*18=36 for the distributed tone RU on BW80. For tone distribution over BW160, if RU26 is distributed over the entire bandwidth (instead of over RU484 or 40 MHz segment), $D_{td}$=4*18=72 for the distributed tone RU on BW160, and the distributed RU26 tone index generation equation becomes:

As mentioned above, distributed-RU sizes greater than 26 can be built based on distributed-RU26 (dRU26, or DT-RU26, or iRU26, etc., in this document) tone sets. For example, one distributed-RU52 (dRU52, or DT-RU52, or iRU52, etc., in this document) can be implemented using two distributed-RU26. Similarly, one distributed-RU106 (dRU106, or DT-RU106, or iRU106, etc., in this document) can consists of four dRU26 or two dRU52. In this case, two leftover or extra tones are appended at the end. One distributed-RU242 (dRU242, or DT-RU242, or iRU242, etc., in this document) can consist of 9 distributed-RU26 with 8 remaining tones appended at the end, or two distributed-RU106 and one distributed RU26 with 4 extra tones are appended at the end.

Figure 6:
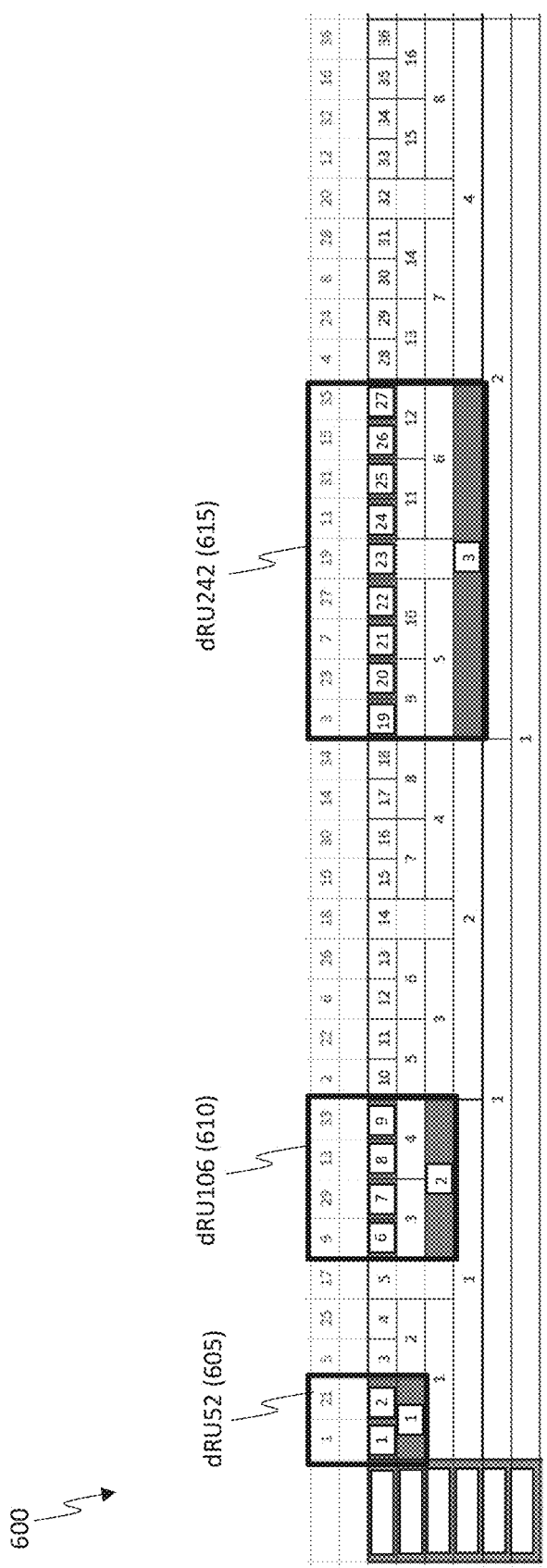
FIG. 6 depicts an exemplary tone distribution for distributed tone RUs dRU52, dRU106, and dRU242 built from distributed RU26s according to embodiments of the present invention.

Edge tone handling can be performed using the equation:

$k_{td} = k_{td} + N_{guard,left}$ $N_{guard,left}$=6 for BW20M and 12 for BQ40M, BQ80M, BW160M etc DC tone handling can be performed using the equation:

If $k_{td} > \frac{N_{fft}}{2} - \left\lceil \frac{N_{DC}}{2} \right\rceil$, $k_{td} = k_{td} + N_{DC}$, $N_{dc} = 3$ for $BW20M$ and 5 for $BW40M, BW80M, BW160M$ FIG. 6 depicts an exemplary tone distribution 600 using distributed RUs RU52, RU106, and RU242 composed of distributed RU26s according to embodiments of the present invention. In the example of FIG. 6, distributed RU52 (605) is generated from 2 distributed RU26s, distributed RU106 (610) is generated from 4 distributed RU26s or 2 distributed RU52s with two extra padding tones, and distributed RU242 (615) is generated from 9 distributed RU26s with 8 extra padding tones. distributed RU242 can also be generated using other combinations, such as 2 distributed RU106s and 1 distributed RU26 with 4 extra tones, for example.

Further exemplary combinations for generating distributed RUs over distribution window 20/40/80 MHz are depicted in FIG. 7A/B/C which lists the distributed RU index and subcarrier range 700 for 26-tone distributed RUs, 52-tone distributed RUs, and 106-tone distributed RUs over BW20/40/80, and 242 tone distributed RUs over BW40/80, and 484-tone distributed RUs over BW80 according to embodiments of the present invention. FIG. 7D is a table 750 howing the number of tones per MHz for exemplary tone distribution methods according to embodiments of the present invention. For example, RU26 can achieve 1 tone per MHz on BW40, BW80, and BW160.

Figure 8:
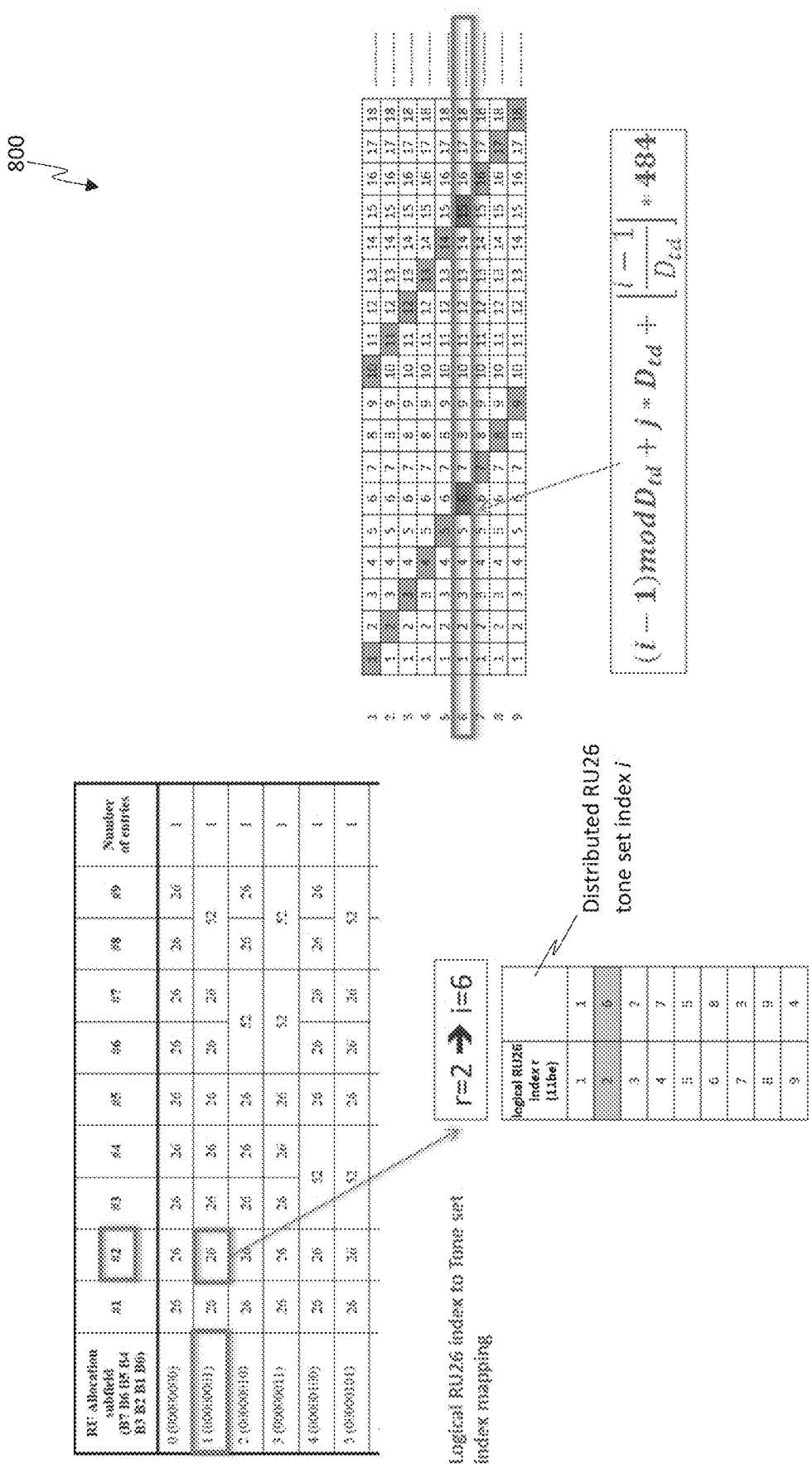
FIG. 8 is a diagram of an exemplary distributed tone mapping process for generating a distributed RU26 on BW20 according to embodiments of the present invention.

With regard to FIG. 8, an exemplary distributed tone mapping process 800 for generating a distributed RU26 on BW20 is depicted according to embodiments of the present invention. The logical RU26 index 805 is mapped to a distributed tone set index as described above. In the example of FIG. 8, the RU allocation subfield for the RU26 indicates a logical index value (r) of 2. The logical RU26 index value is mapped to the starting subcarrier index for distributed RU26 index (i) (equal to 6) using Equation IV above. The distributed tones are separated by a distance equal to DTD.

Figure 9:
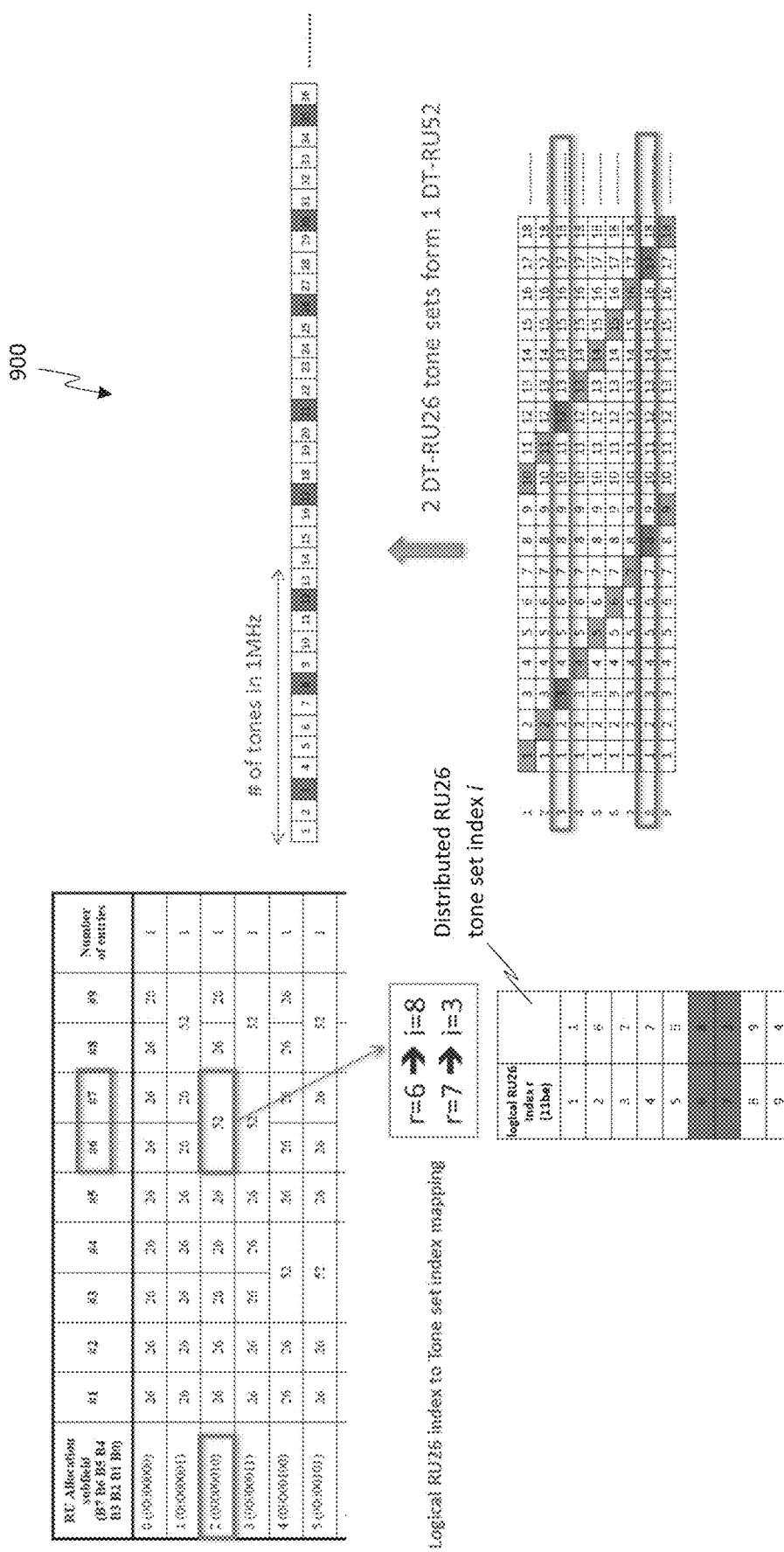
FIG. 9 is a diagram of an exemplary distributed tone mapping process for generating a distributed RU52 on BW20 using a 26-tone RU based dRU design method according to embodiments of the present invention.

With regard to FIG. 9, an exemplary distributed tone mapping process 900 for generating a distributed RU52 on BW20 is depicted according to embodiments of the present invention. The logical RU52 index 905 is mapped to a distributed tone set index as described above. In the example of FIG. 9, the RU allocation subfield for the RU52 indicates the corresponding logical RU26 index values (r) of 6 and 7. The logical RU26 index values are mapped to the corresponding dRU26 starting subcarrier index (or dRU tone set index) for distributed RU52 index (i) 910, equal to 8 and 3, respectively. The distributed tones are separated by a distance equal to DTD.

Figure 10:
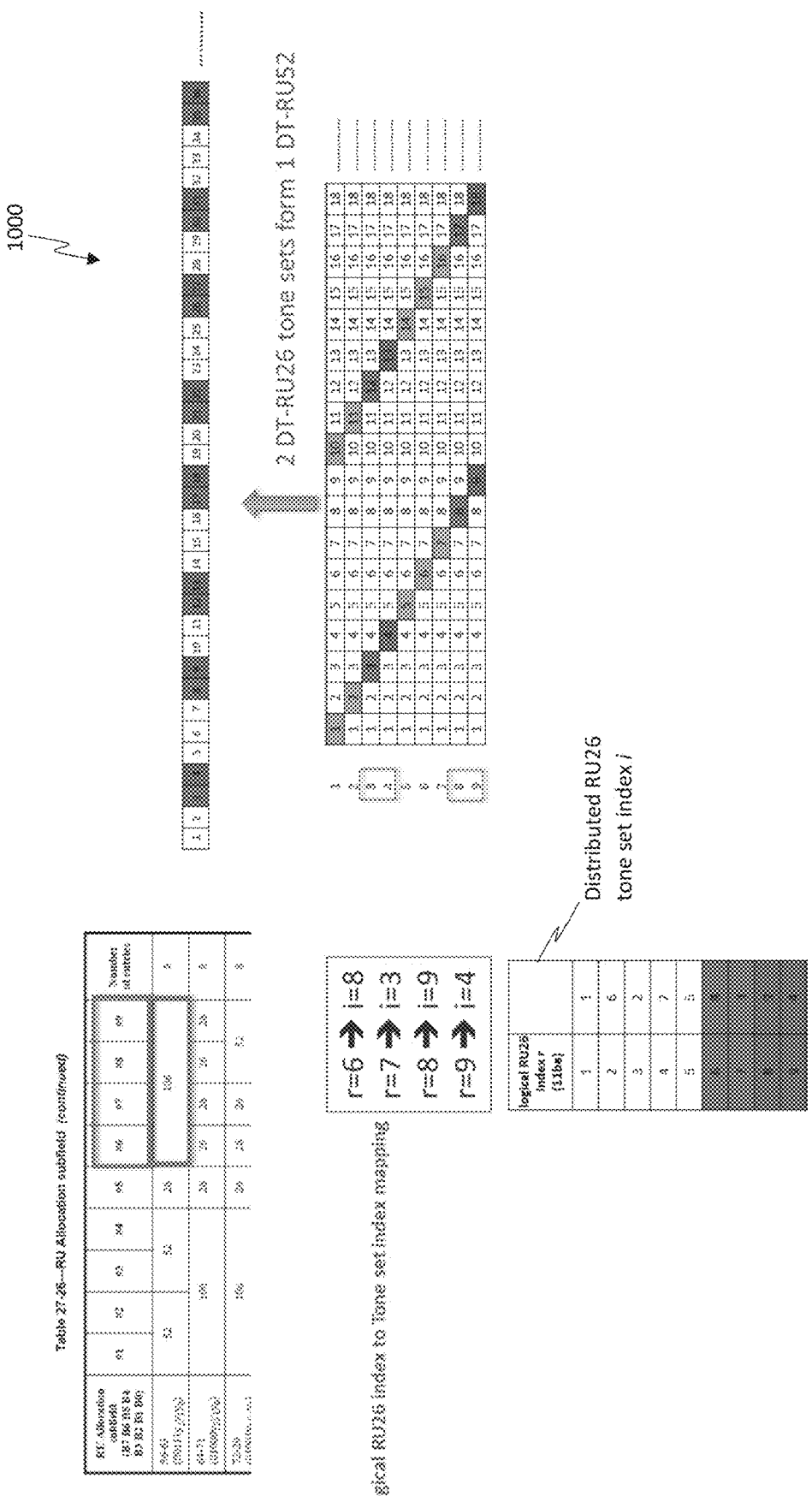
FIG. 10 is a diagram of an exemplary distributed tone mapping process 1000 for generating a distributed RU106 on BW20 using a 26-tone RU based dRU design method according to embodiments of the present invention.

With regard to FIG. 10, an exemplary distributed tone mapping process 1000 for generating a distributed RU106 on BW20 is depicted according to embodiments of the present invention. The logical RU106 corresponding RU26 index 1005 is mapped to a dRU26 tone set index as described above. In the example of FIG. 10, the distributed RU106 is generated using 4 distributed RU26s, and the allocation subfield for the RU106 indicates corresponding logical RU26 index values (r) of 6, 7, 8, and 9 for the distributed RU26s. The logical RU26 index values are mapped to the dRU26 starting subcarrier index (or dRU26 tone set index) for distributed RU106 index (i) which equals 8, 3, 9, and 4, respectively. The distributed tones are separated by a distance equal to DTD. Two extra tones are appended after distributed RU104 to prevent issues caused by tones overlapping. The extra tones can be either hand-picked or selected by an extended repeatable pattern from the four corresponding distributed RU26s.

Figure 11:
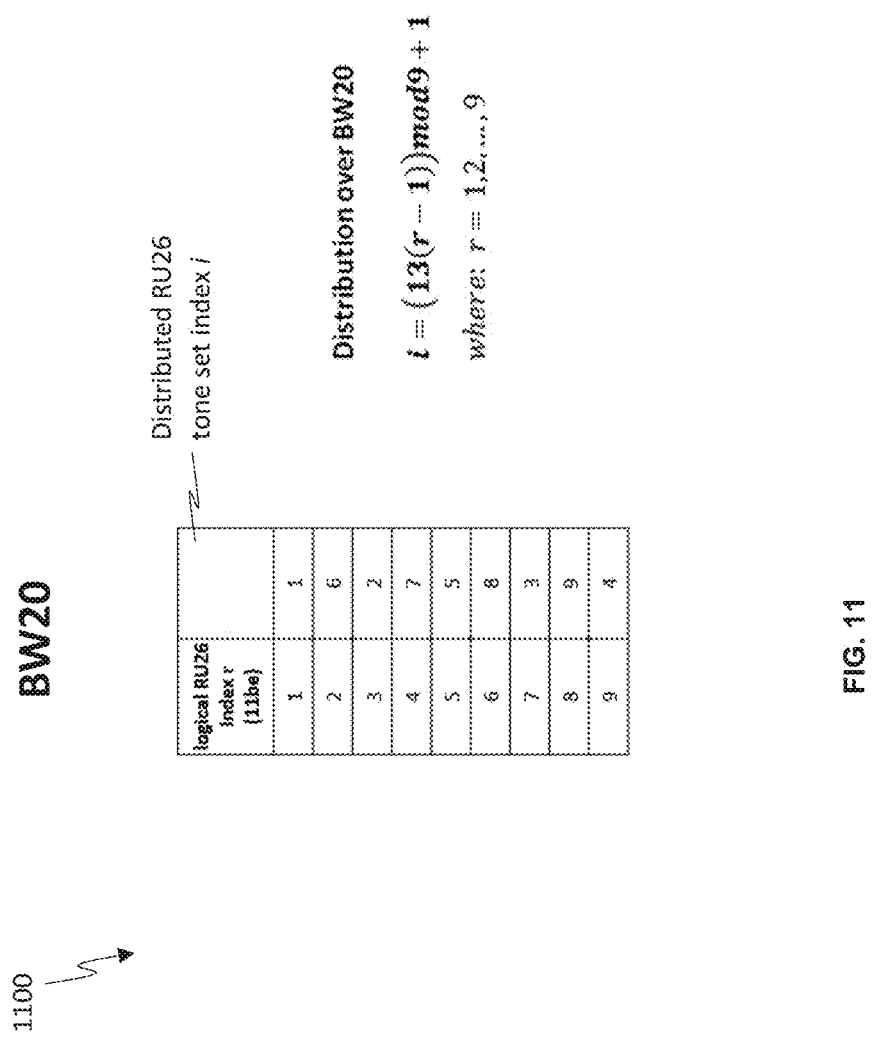
FIG. 11 is a diagram of a logical RU26 to distributed RU26 tone set index on BW20 using a 26-tone RU based RU design method according to embodiments of the present invention.
Figure 12:
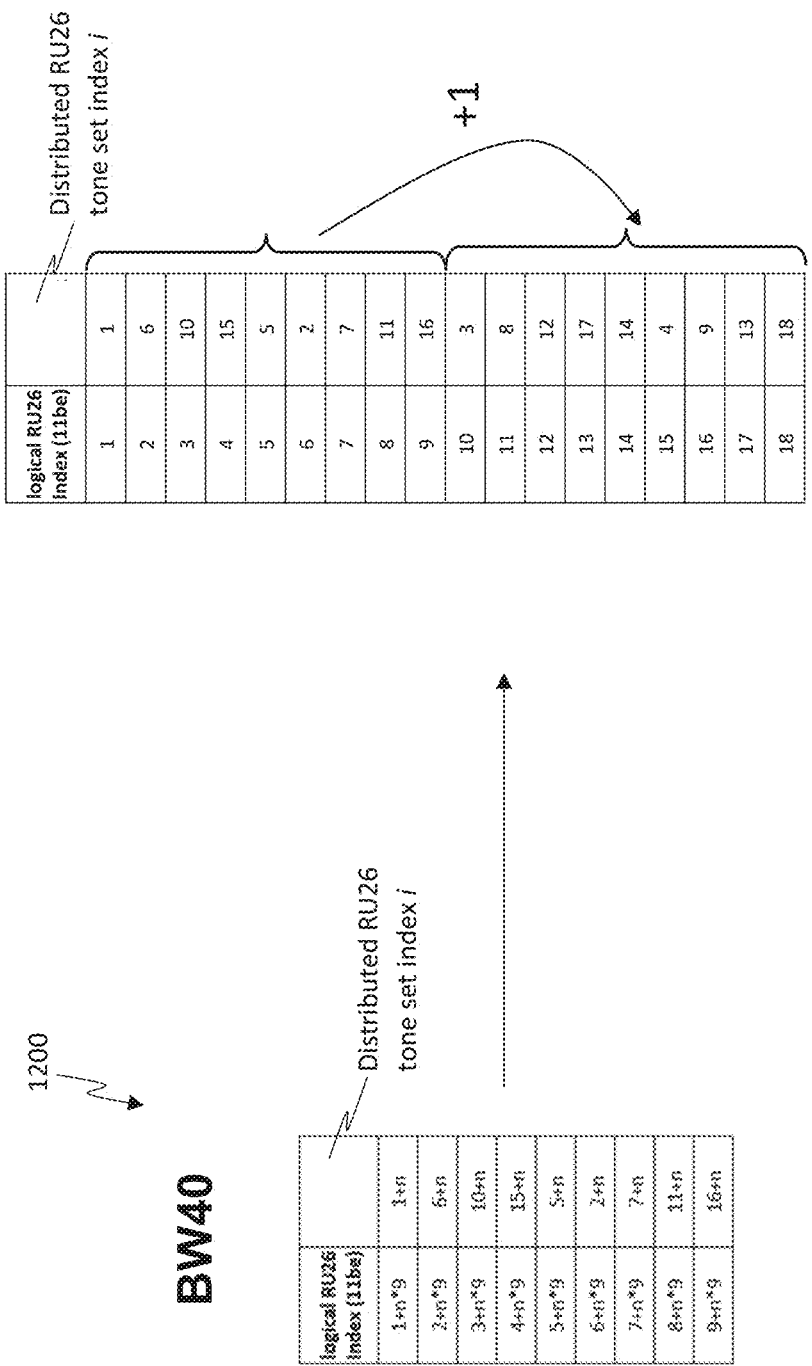
FIG. 12 is a diagram of a logical RU26 to distributed RU26 tone set index on BW40 using a 26-tone RU based RU design method according to embodiments of the present invention.
Figure 13:
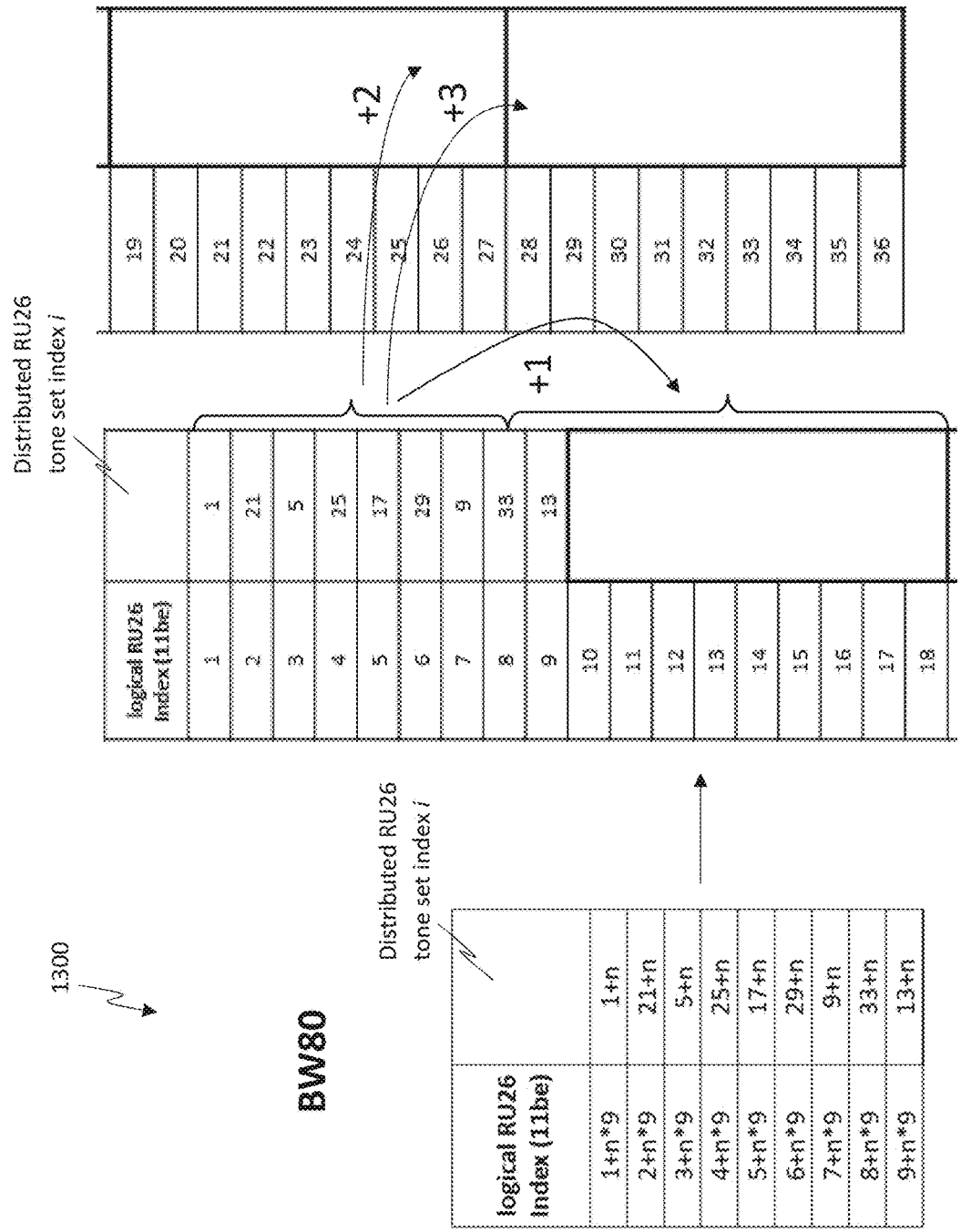
FIG. 13 is a diagram of a logical RU26 to distributed RU26 tone set index on BW80 using a 26-tone RU based RU design method according to embodiments of the present invention.
Figure 14:
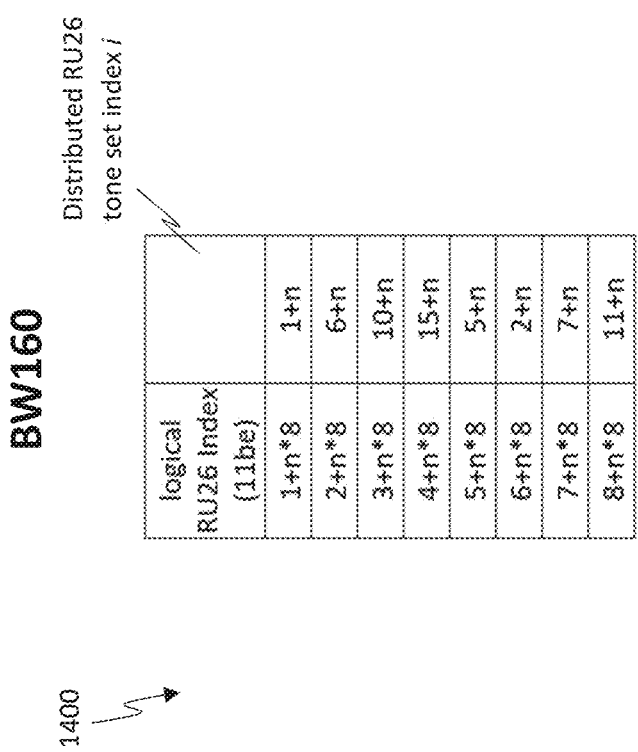
FIG. 14 is a diagram of a logical RU26 to distributed RU26 tone set index on BW160 using a 26-tone RU based RU design method according to embodiments of the present invention.

FIGS. 11-14 depict exemplary tables that map logical index values to distributed index values to advantageously generate approximately −1 dBm/MHz for uplink transmission, and 5 dBm/MHz for downlink communication, in accordance with LPI 6 GHz PSD requirements. Specifically, FIG. 11 depicts an exemplary logical RU26 to dRU26 tone set index mapping table 1100 for mapping index values on BW20 according to embodiments of the present invention. FIG. 12 depicts an exemplary logical RU26 to dRU26 tone set index mapping table 1200 for mapping index values on BW40 according to embodiments of the present invention. FIG. 13 depicts an exemplary logical RU26 to dRU26 tone set index mapping table 1300 for mapping index values on BW80 according to embodiments of the present invention. FIG. 14 depicts an exemplary logical RU26 to dRU26 tone set index mapping table 1400 for mapping index values on BW160 according to embodiments of the present invention.

Figure 15A:
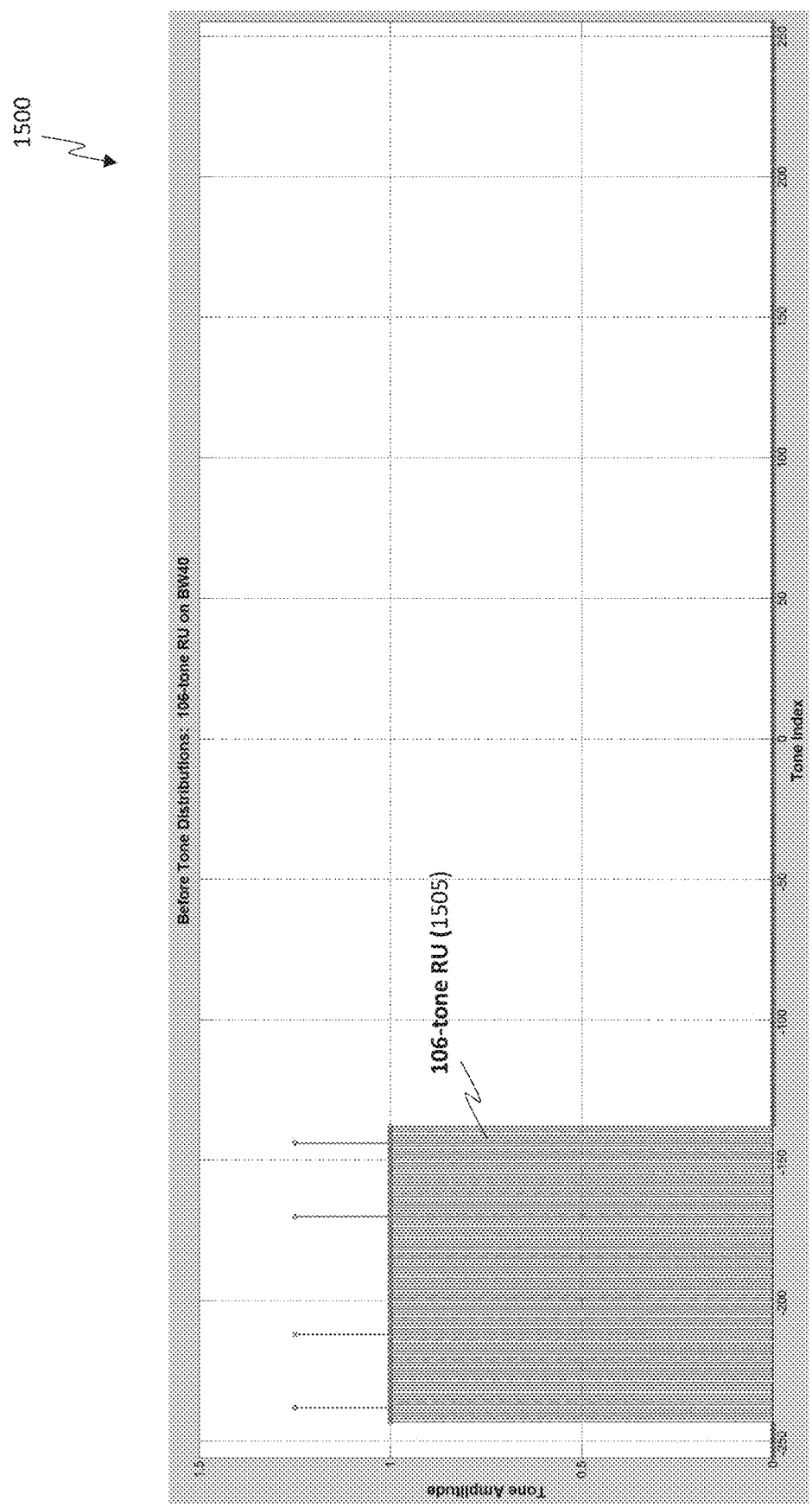
FIG. 15A is a graph depicting an exemplary tone distribution of an RU106 on BW40 before tone distribution according to embodiments of the present invention.
Figure 15B:
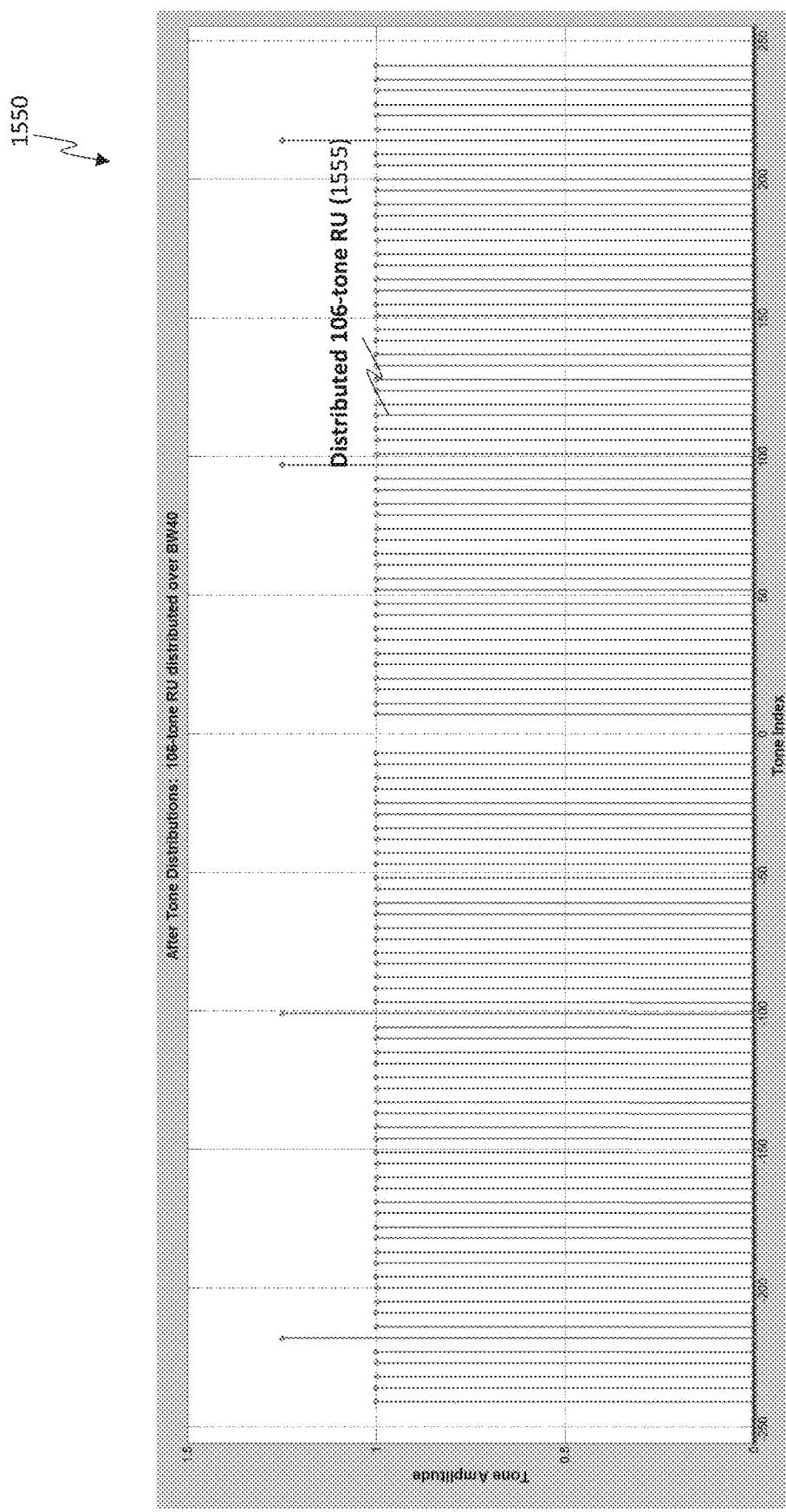
FIG. 15B is a graph depicting an exemplary tone distribution of an RU106 on BW40 after tone distribution according to embodiments of the present invention.

FIG. 15A is a graph 1500 depicting tone amplitudes of tone index values of an RU106 1505 on BW40 before tone distribution according to embodiments of the present invention. FIG. 15B is a graph 1550 depicting tones of an exemplary tone amplitudes for tone index values the RU106 1505 after tone distribution. In dRU106 1555 (distributed over BW40) as depicted in FIG. 15B, the distributed index values are distributed over a larger bandwidth to advantageously generate approximately −1 dBm/MHz for uplink transmission, and 5 dBm/MHz for downlink communication, in accordance with LPI 6 GHz PSD requirements.

Figure 16A:
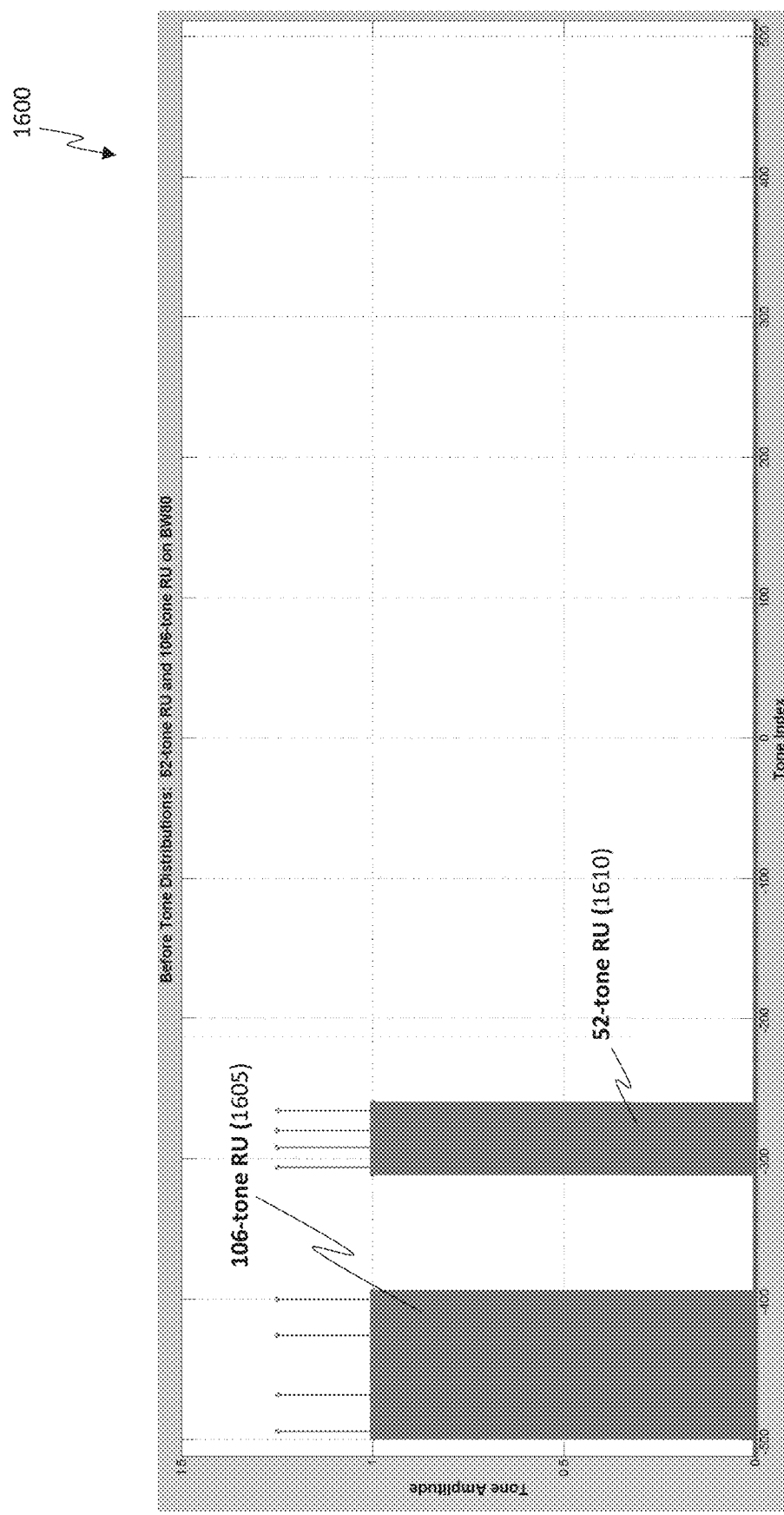
FIG. 16A is a graph depicting an exemplary tone distribution of an RU56 and an RU106 on BW80 before tone distribution according to embodiments of the present invention.
Figure 16B:
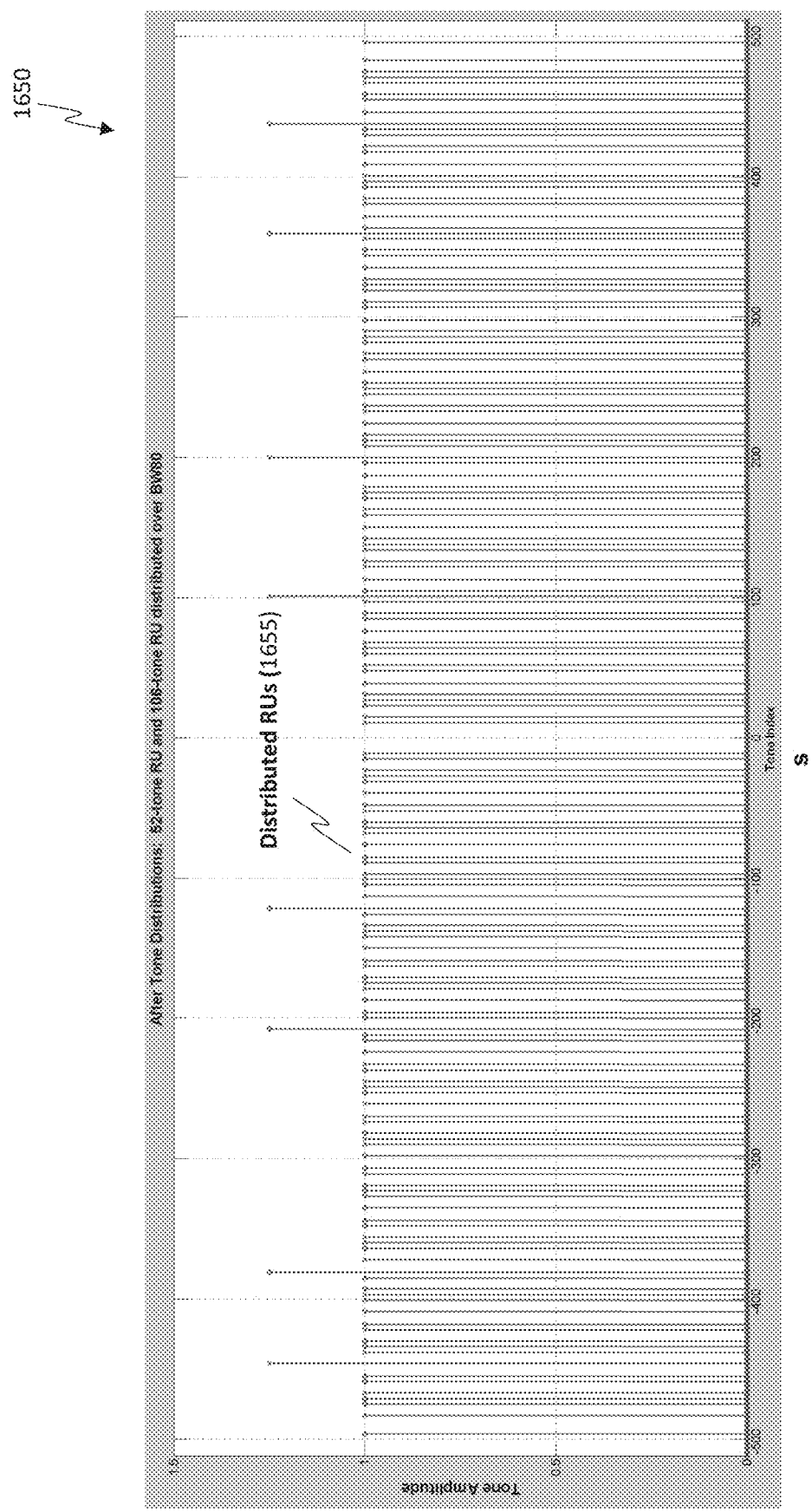
FIG. 16B is a graph depicting an exemplary tone distribution of an RU56 and an RU106 on BW80 after tone distribution according to embodiments of the present invention.

FIG. 16A is a graph 1600 depicting tone amplitudes of tone index values of an RU106 1605 and an RU52 1610 on BW80 before tone distribution according to embodiments of the present invention. FIG. 16B is a graph 1650 depicting tones of an exemplary tone amplitudes for tone index values of RUs 1605 and 1610 after tone distribution. Distributed RUs 1655 are distributed over a larger bandwidth to advantageously generate approximately −1 dBm/MHz for uplink transmission, and 5 dBm/MHz for downlink communication, in accordance with LPI 6 GHz PSD requirements.

Figure 17:
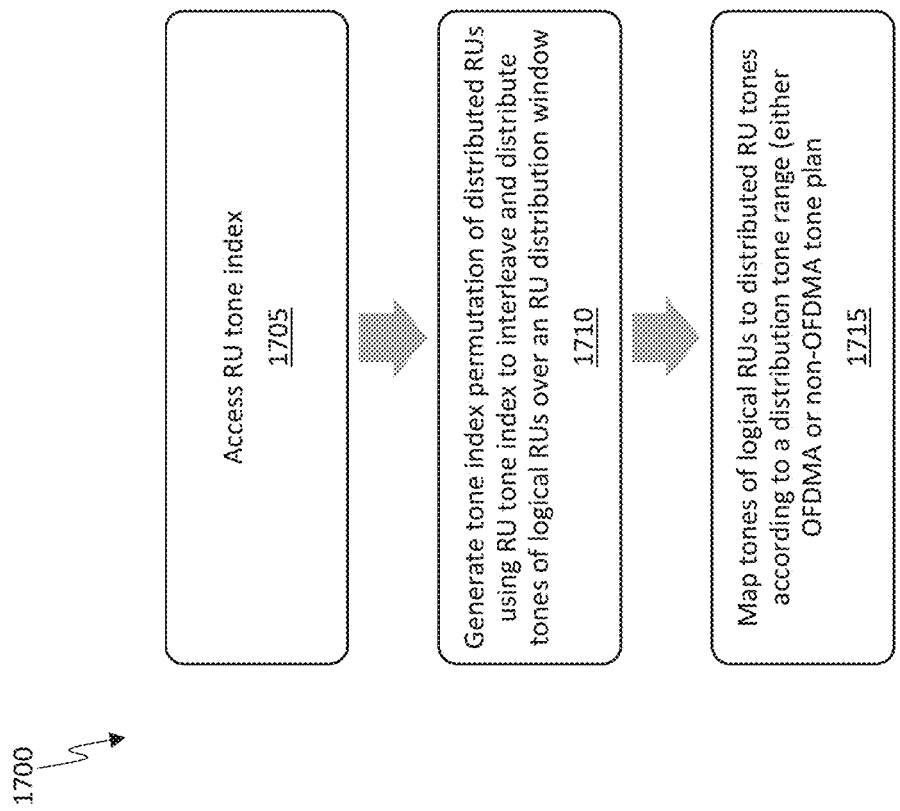
FIG. 17 is a flowchart of an exemplary computer implemented process for automatically generating a distributed tone index for transmission using distributed resource units according to embodiments of the present invention.

FIG. 17 is a flowchart of an exemplary computer implemented process 1700 for automatically generating a distributed tone index for transmission using distributed resource units according to embodiments of the present invention. Process 1700 can be used to generate approximately −1 dBm/MHz for uplink transmission, and 5 dBm/MHz for downlink communication, in accordance with LPI 6 GHz PSD requirements. Using a large bandwidth for transmission increases wireless coverage for an environment within the limitations of LPI.

At step 1705, an RU tone index RUs for assigned RUs is accessed or generated. For example, the RU tone index can be generated in conformance with existing 802.11 standards (e.g., 802.11be). Local mapping can be performed according to a predetermined equation or by accessing a table of index values.

At step 1710, a tone index permutation of distributed RUs is generated using the RU tone index to distributed tones of logical RUs over a distribution window. The tone index permutation can be generated using global tone distribution (Equation I), where the parameter DTD defines the distance between distributed tones. The tones of the distributed RUs are interleaved or interlaced in an alternating manner.

At step 1715, tone mapping is performed to map the tones of the logical RUs to distributed RU tones that are distributed across a resource unit distribution window according to a distribution tone range, which could be either an OFDMA tone plan or a non-OFDMA tone plan.

Figure 18:
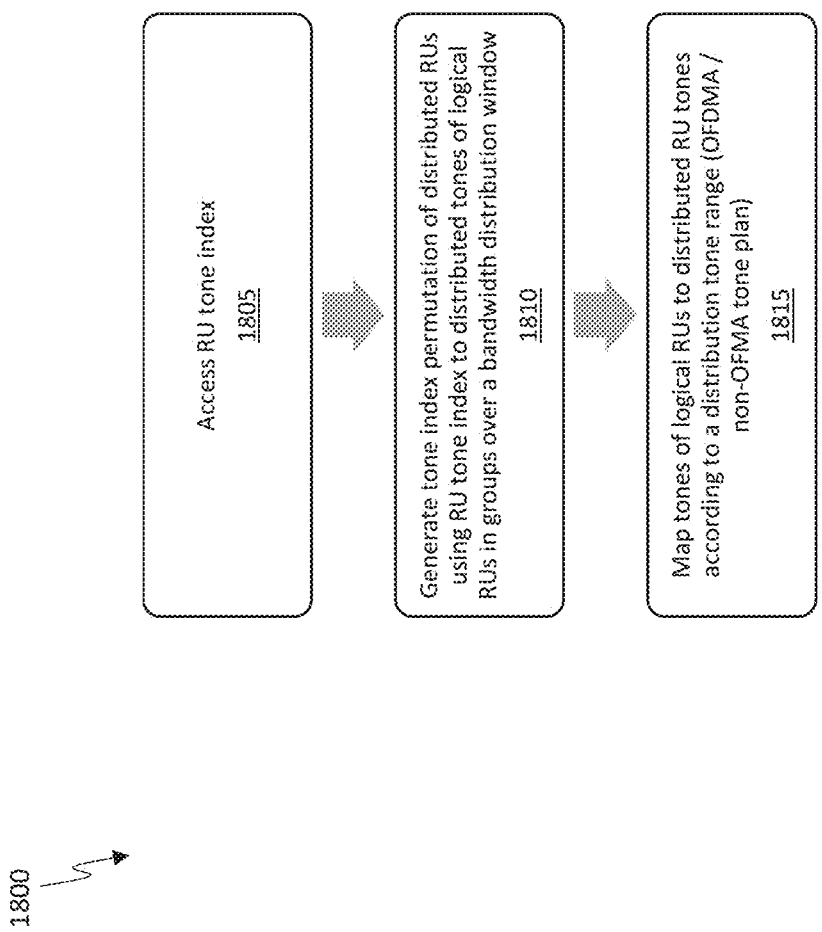
FIG. 18 is a flowchart of an exemplary computer implemented process for automatically generating a distributed group-based tone index for transmission using distributed resource units according to embodiments of the present invention.

FIG. 18 is a flowchart of an exemplary computer implemented process 1800 for automatically generating a group-based tone distribution for transmission using distributed resource units according to embodiments of the present invention. Process 1800 can be used to generate approximately −1 dBm/MHz for uplink transmission, and 5 dBm/MHz for downlink communication, in accordance with LPI 6 GHz PSD requirements. Using a large bandwidth for transmission increases wireless coverage for an environment within the limitations of LPI.

At step 1805, an RU tone index is accessed or generated. For example, the tone index can be generated in conformance with existing 802.11 standards (e.g., 802.11be). Local mapping can be performed according to a predetermined equation or by accessing a table of index values.

At step 1810, a tone index permutation of distributed RUs is generated using the RU tone index to distribute tones of logical RUs over a distribution window. The distributed tone index values can be calculated using Equation II or Equation III described above, for example. The parameter DTD defines the distance between distributed tones. The distributed tones are grouped according to a parameter (NSG) that defines the number of subcarrier in a group for tone distribution.

At step 1815, tone mapping is performed to map the tones of the logical RUs to distributed RU tones that are distributed across a bandwidth distribution window according to a distribution tone range (either an OFDMA or a non-OFDMA tone plan).

Figure 19:
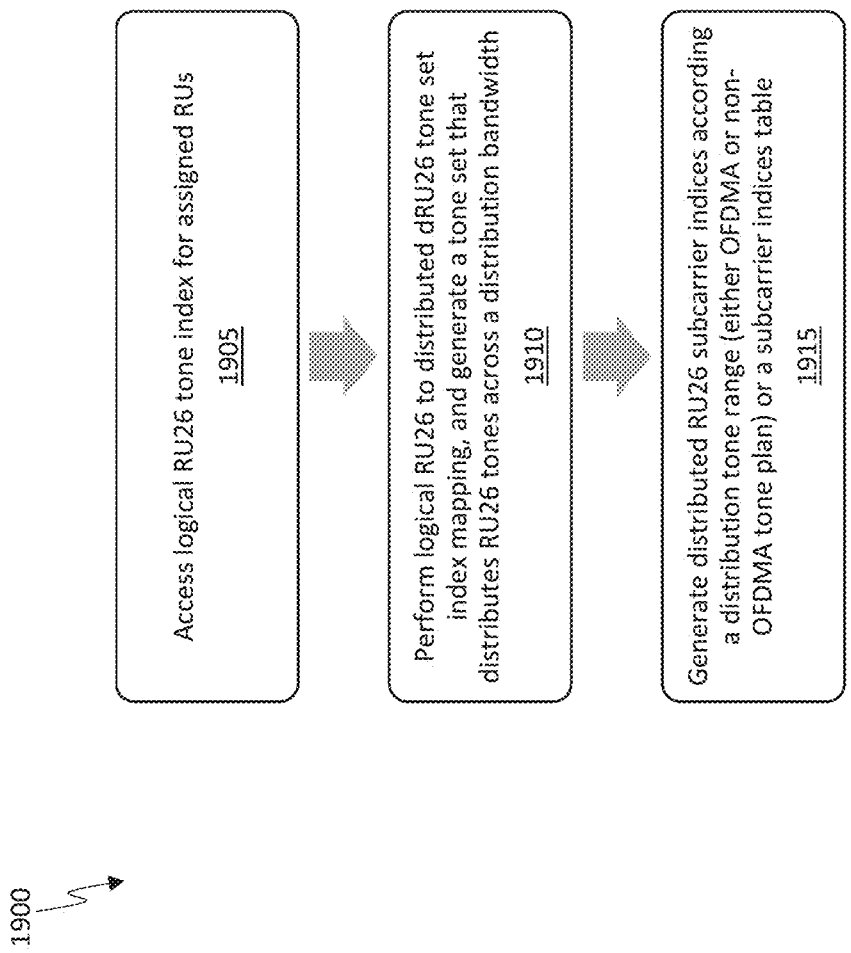
FIG. 19 is a flowchart of an exemplary computer implemented process for automatically generating a distributed tone index based on distributed RU26s for transmission using distributed resource units according to embodiments of the present invention.

FIG. 19 is a flowchart of an exemplary computer implemented process 1900 for automatically generating a distributed tone index based on distributed RU26s for transmission using distributed resource units according to embodiments of the present invention. Advantageously, process 1900 can be used to generate approximately −1 dBm/MHz for uplink transmission, and 5 dBm/MHz for downlink communication, in accordance with LPI 6 GHz PSD requirements. Using a large bandwidth for transmission increases wireless coverage for an environment within the limitations of LPI.

At step 1905, a logical RU26 tone index is accessed or generated for assigned RUs.

At step 1910, tone mapping is performed on the distributed RU26 index to generate a tone set that distributes tones of the assigned RUs across a bandwidth distribution window. Larger distributed RUs, such as distributed RU52, distributed RU106, and distributed RU242 can be formed using RU26 tones and extra tones for padding.

At step 1915, a distributed RU26 index is generated based on the logical RU26 index and the distribution tone range (either OFDMA or non-OFDMA tone plan). The distributed RU26 index can be generated using Equation IV or by accessing a table of index values, for example.

Exemplary Computer Controlled System

Figure 20:
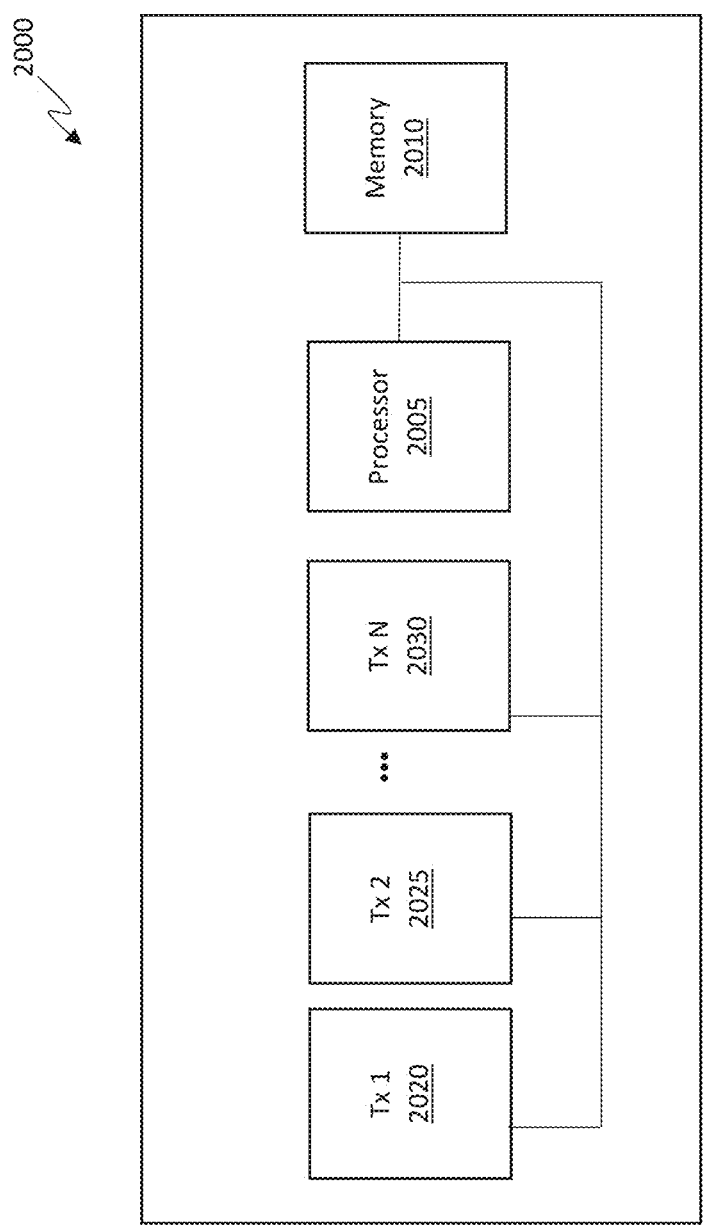
FIG. 20 is a block diagram depicting an exemplary computer system platform upon which embodiments of the present invention may be implemented.

FIG. 20 depicts an exemplary wireless device 2000 upon which embodiments of the present invention can be implemented. Embodiments of the present invention are drawn to electronic systems capable of transmitting and/or receiving data using LPI over a 6 GHz wireless band. Assigned RUs are mapped to logical RUs and distributed across a distribution window to meet PSD requirements of LPI using a global tone mapper. Advantageously, wireless device 2000 can be used to generate approximately −1 dBm/MHz for uplink transmission, and 5 dBm/MHz for downlink communication, in accordance with LPI 6 GHz PSD requirements. Using a large bandwidth for transmission increases wireless coverage for an environment within the limitations of LPI.

The wireless device 2000 includes a processor 2005 for running software applications and optionally an operating system. Memory 2010 can include read-only memory and/or random access memory, for example, to store applications and data (e.g., tables of index values) for use by the processor 2005 and data received or transmitted by transceivers 2020, 2025, and 2030. The wireless device 2000 can include fewer or more transceivers according to some embodiments. The transceivers 2020, 2025, 2030 communicate with other electronic devices over a wireless network (e.g., WLAN) and typically operates according to IEEE standards (e.g., IEEE 802.11ax, IEEE 802.11ay, IEEE 802.11be, etc.), including LPI.

Embodiments of the present invention are thus described. While the present invention has been described in particular embodiments, it should be appreciated that the present invention should not be construed as limited by such embodiments, but rather construed according to the following claims.

What is claimed is:

1. A method of tone distribution for transmission in a wireless network, the method comprising:
   accessing a resource unit (RU) tone index;
   generating a tone index permutation of distributed RUs using the RU tone index to distribute tones of logical RUs over a distribution window according to a tone distance parameter (DTD) and a number of subcarriers per logical RU tone group; and
   performing tone mapping to map tones of the logical RUs to tones of the distributed RUs, wherein the tone mapping comprises grouping logical RUs based on a number of subcarriers per logical RU tone group, wherein the distribution window is defined according to a frequency bandwidth (BW) or a frequency subblock, wherein the generating the tone index permutation comprises generating distributed tone index values using the relationship:

$$k_{td} = (k * D_{td}) \bmod N_{st} + \left\lfloor \frac{k}{N_{col}} \right\rfloor,$$

wherein $k_{td}$ represents the distributed tone index, $D_{td}$ represents the tone mapping distance, k represents a distributed RU tone index, $N_{st}$ represents a number of tones, and $N_{col}$ represents $N_{st}$ divided by the greatest common divisor of ($N_{st}$, $D_{td}$).

2. The method as described in claim 1, wherein the distribution window is defined according to a frequency bandwidth (BW) or a frequency subblock.

3. The method as described in claim 2, wherein the distribution window size comprises at least one of: 20 MHz; 40 MHz; 60 MHz; 80 MHz; and 160 MHz.

4. The method as described in claim 2, wherein the generating a tone index permutation of distributed RUs comprises interleaving tones of the logical RUs.

5. The method as described in claim 2, wherein the tone distance parameter is determined based on a size of the distribution window and logical RU size.

6. The method as described in claim 1, wherein the logical RUs comprise at least one of a 26-tone RU, 52-tone RU, 106-tone RU, 242-tone RU, and a 484-tone RU.

7. The method as described in claim 1, wherein the distribution window is defined according to a bandwidth.

8. The method as described in claim 7, wherein the bandwidth comprises at least one of: BW20; BW40; BW80; and BW160.

9. The method as described in claim 7, wherein generating a tone index permutation of distributed RUs comprises grouping tones of the logical RUs.

10. The method as described in claim 9, wherein the tone distance parameter is determined based on a size of the distribution window and a parameter defining a number of subcarriers per logical RU tone group (Nsg), wherein a number of subcarriers in a tone group is determined based on the size of the distribution window and a size of the logical RUs, and further wherein the grouping tones of the logical RUs is performed according to the number of subcarriers per logical RU tone group.

11. The method as described in claim 7, wherein the generating the tone index permutation of logical RUs comprises generating distributed tone index values using the relationship:

$$k_{td} = (k \bmod N_{sg}) + N_{sg} * (r-1) + D_{td} * \left\lfloor \frac{k}{N_{sg}} \right\rfloor,$$

wherein $k_{td}$ represents the distributed tone index, $N_{sg}$ represents the number of subcarriers per logical RU tone group, r represents a logical index value, and $D_{td}$ represents a tone mapping distance.

12. The method of claim 1, further comprising performing a downlink transmission using the distributed RUs in a Low Power Indoor (LPI) mode, wherein performing the downlink transmission generates an output within a range of 4 to 6 dBm/MHz.

13. The method of claim 1, further comprising performing an uplink transmission using the distributed RUs in a Low Power Indoor (LPI) mode, wherein performing the uplink transmission generates an output within a range of −2 to 0 dBm/MHz.

14. A method of tone distribution for transmission in a wireless network, the method comprising:
   accessing a logical RU26 tone index for assigned RUs;
   mapping logical RU26 tones of the logical RU26 tone index to distributed RU26 tones according to the relationship i=(13(r−1))mod 9+1, wherein i represents an RU26 tone set index value and r represents a logical RU26 index value; and
   generating a distributed RU26 tone index using the distributed RU26 tones to distribute the RU26 tones across a distribution window.

15. The method of claim 14, wherein the generating a distributed RU26 tone index using the distributed RU26 tones comprises generating distributed RU26 tone index values using the relationship:

$$k_{td} = (i-1) \bmod D_{td} + j*D_{td} + \left\lfloor \frac{i-1}{D_{td}} \right\rfloor *484 \text{ or}$$

$$k_{td} = (i-1) \bmod D_{td} + j*D_{td},$$

wherein $k_{td}$ represents the distributed tone index, $D_{td}$ represents the tone mapping distance, i represents an RU26 tone set index value, and j represents a distributed index value.

16. The method of claim 14, further comprising appending extra tones to form the distributed RU.

17. An apparatus, comprising:
a transceiver operating on a 6 GHz wireless band;
a memory; and
a processor operable to:
  access a resource unit (RU) tone index stored in the memory;
  generate a tone index permutation of distributed RUs using the RU tone index to distribute tones of logical RUs over a distribution window according to a tone distance parameter (DTD); and
  perform tone mapping to map tones of the logical RUs to tones of the distributed RUs, wherein the tone mapping comprises grouping logical RUs based on a number of subcarriers per logical RU tone group, wherein the distribution window is defined according to a frequency bandwidth (BW) or a frequency subblock, wherein the generating the tone index permutation comprises generating distributed tone index values using the relationship:

$$k_{td} = (k*D_{td}) \bmod N_{st} + \left\lfloor \frac{k}{N_{col}} \right\rfloor,$$

wherein $k_{td}$ represents the distributed tone index, $D_{td}$ represents the tone mapping distance, k represents a distributed RU tone index, $N_{st}$ represents a number of tones, and $N_{col}$ represents $N_{st}$ divided by the greatest common divisor of ($N_{st}$, $D_{td}$).

* * * * *